(12) United States Patent
Witt

(10) Patent No.: US 6,367,001 B1
(45) Date of Patent: Apr. 2, 2002

(54) PROCESSOR INCLUDING EFFICIENT FETCH MECHANISM FOR L0 AND L1 CACHES

(75) Inventor: David B. Witt, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/735,197

(22) Filed: Dec. 8, 2000

Related U.S. Application Data

(63) Continuation of application No. 09/099,984, filed on Jun. 19, 1998, now Pat. No. 6,199,154.
(60) Provisional application No. 60/065,878, filed on Nov. 17, 1997.

(51) Int. Cl.[7] ................................................. G06F 9/32
(52) U.S. Cl. ....................... 712/205; 711/122; 712/207; 712/237
(58) Field of Search ................................ 711/119, 122; 712/205, 207, 237

(56) References Cited

U.S. PATENT DOCUMENTS

| | | | |
|---|---|---|---|
| 4,044,338 A | 8/1977 | Wolf | 365/49 |
| 4,453,212 A | 6/1984 | Gaither et al. | 711/2 |
| 4,807,115 A | 2/1989 | Torng | 712/215 |
| 4,858,105 A | 8/1989 | Kuriyama et al. | 712/235 |
| 4,928,223 A | 5/1990 | Dao et al. | 712/247 |
| 5,053,631 A | 10/1991 | Perlman et al. | 708/508 |
| 5,058,048 A | 10/1991 | Gupta et al. | 708/508 |
| 5,129,067 A | 7/1992 | Johnson | 712/213 |
| 5,136,697 A | 8/1992 | Johnson | 712/239 |
| 5,226,126 A | 7/1993 | McFarland et al. | 712/218 |
| 5,226,130 A | 7/1993 | Favor et al. | 712/238 |
| 5,551,001 A | 8/1996 | Cohen et al. | 711/122 |

(List continued on next page.)

FOREIGN PATENT DOCUMENTS

| | | |
|---|---|---|
| EP | 0259095 | 3/1988 |
| EP | 0381471 | 8/1990 |
| EP | 0459232 | 12/1991 |
| GB | 2263985 | 8/1993 |
| GB | 2263987 | 8/1993 |
| GB | 2281422 | 3/1995 |

OTHER PUBLICATIONS

Intel, "Chapter 2: Microporcessor Architecture Overview," 1994, pp. 2–1 through 2–4.
Michael Slater, "AMD's K5 Designed to Outrun Pentium," Microprocessor Report, vol. 8, No. 14, Oct. 24, 1994, 7 pages.
Sebastian Rupley and John Clyman, "P6: The Next Step?," PC Magazine, Sep. 12, 1995, 16 pages.
Tom R. Halfhill, "AMD K6 Takes On Intel P6," BYTE, Jan. 1996, 4 pages.
"*Intel Architecture Software Developer's Manual, vol. 1: Basic Architecture*", Intel Corporation, Prospect IL, 1996, 1997, Chapter 8: Programming With The Intel MMX™ Technology, pp. 8–1 through 8–15.
Holstad, S., "Tutorial Tuesday: Decoding MMX" Jan. 14, 1997, Earthlink Network, Inc. copyright 1997, 5 pages (see http://www.earthlink.net/daily/Tuesday/MMX).
"Intel MMX™ Technology—Frequently Asked Questions" 6 pages (see http://www.intel.com/drg/mmx/support/faq/htm).

*Primary Examiner*—Kenneth S. Kim
(74) *Attorney, Agent, or Firm*—Conley, Rose & Tayon, PC; Lawrence J. Merkel

(57) ABSTRACT

A processor employs a first instruction cache, a second instruction cache, and a fetch unit coupled to the first instruction cache and the second instruction cache. The fetch unit generates a branch target address responsive to a branch instruction which includes a displacement. Additionally, the fetch unit selects one of the first instruction cache and the second instruction cache from which to fetch instructions stored at the branch target address responsive to a size of the displacement.

26 Claims, 8 Drawing Sheets

U.S. PATENT DOCUMENTS

| | | |
|---|---|---|
| 5,561,782 A | 10/1996 | O'Connor .................... 711/140 |
| 5,651,125 A | 7/1997 | Witt et al. .................. 712/218 |
| 5,721,864 A | 2/1998 | Chiarot et al. ............... 711/137 |
| 5,737,750 A | 4/1998 | Kumar et al. ................ 711/129 |
| 5,740,417 A | 4/1998 | Kennedy et al. ............. 712/239 |
| 5,848,432 A | 12/1998 | Hotta et al. .................. 711/131 |
| 5,860,096 A | 1/1999 | Undy et al. .................. 711/122 |
| 5,933,860 A | 8/1999 | Emer et al. .................. 711/213 |
| 5,946,710 A | 8/1999 | Bauman et al. ............. 711/129 |
| 6,199,154 B1 | 3/2001 | Witt ........................... 712/205 |

PROCESSOR INCLUDING EFFICIENT FETCH MECHANISM FOR L0 AND L1 CACHES

This Application is a continuation of U.S. patent application Ser. No. 09/099,984 filed Jun. 19, 1998, now issued U.S. Pat. No. 6,199,154, which claims benefit of priority to the Provisional Application serial No. 60/065,878, entitled "High Frequency, Wide Issue Microprocessor" filed on Nov. 17, 1997 by Witt. The Provisional Application is incorporated herein by reference in its entirety.

BACKGROUND OF THE INVENTION

1. Field of the Invention

This invention is related to the field of processors and, more particularly, to instruction fetch mechanisms within processors.

2. Description of the Related Art

Superscalar processors attempt to achieve high performance by dispatching and executing multiple instructions per clock cycle, and by operating at the shortest possible clock cycle time consistent with the design. To the extent that a given processor is successful at dispatching and/or executing multiple instructions per clock cycle, high performance may be realized. In order to increase the average number of instructions dispatched per clock cycle, processor designers have been designing superscalar processors which employ wider issue rates. A "wide issue" superscalar processor is capable of dispatching (or issuing) a larger maximum number of instructions per clock cycle than a "narrow issue" superscalar processor is capable of dispatching. During clock cycles in which a number of dispatchable instructions is greater than the narrow issue processor can handle, the wide issue processor may dispatch more instructions, thereby achieving a greater average number of instructions dispatched per clock cycle.

In order to support wide issue rates, it is desirable for the superscalar processor to be capable of fetching a large number of instructions per clock cycle (on the average). For brevity, a processor capable of fetching a large number of instructions per clock cycle (on the average) will be referred to herein as having a "high fetch bandwidth". If the superscalar processor is unable to achieve a high fetch bandwidth, then the processor may be unable to take advantage of the wide issue hardware due to a lack of instructions being available for issue.

Several factors may impact the ability of a particular processor to achieve a high fetch bandwidth. For example, many code sequences have a high frequency of branch instructions, which may redirect the fetching of subsequent instructions within that code sequence to a branch target address specified by the branch instruction. Accordingly, the processor may identify the branch target address upon fetching the branch instruction. Subsequently, the next instructions within the code sequence may be fetched using the branch target address. Processors attempt to minimize the impact of branch instructions on the fetch bandwidth by employing highly accurate branch prediction mechanisms and by generating the subsequent fetch address (either branch target or sequential) as rapidly as possible.

Another factor which may impact the ability of a particular processor to achieve a high fetch bandwidth is the hit rate and latency of an instruction cache employed by the processor. Processors typically include an instruction cache to reduce the latency of instruction fetches (as compared to fetching from main memory external to the processor). By providing low latency access to instructions, instruction caches may help achieve a high fetch bandwidth. Furthermore, the low latency of access to the instructions may allow branch instructions to be rapidly detected and corresponding branch target addresses to be rapidly generated for subsequent instruction fetches.

Modern processors have been attempting to achieve shorter clock cycle times in order to augment the performance gains which may be achieved with high issue rates. Unfortunately, the short clock cycle times being employed by modern processors tend to limit the size of an instruction cache which may be employed. Generally, larger instruction caches have a higher latency than smaller instruction caches. At some size, the instruction cache access time (i.e. latency from presenting a fetch address to the instruction cache and receiving the corresponding instructions therefrom) may even exceed the desired clock cycle time. On the other hand, larger instruction caches typically achieve higher hit rates than smaller instruction caches.

Both high hit rates in the instruction cache and low latency access to the instruction cache are important to achieving high fetch bandwidth. If hit rates are low, than the average latency for instruction access may increase due to the more frequent main memory accesses required to fetch the desired instructions. Because larger instruction caches are capable of storing more instructions, they are more likely to be storing the desired instructions (once the instructions have been accessed for the first time) than smaller caches (which replace the instructions stored therein with other instructions within the code sequence more frequently). On the other hand, if the latency of each cache access is increased (due to the larger size of the instruction cache), the average latency for fetching instructions increases as well. As mentioned above, low average latency is important to achieving high fetch bandwidth by allowing more instructions to be fetched per clock cycle at a desired clock cycle time and by aiding in the more rapid detection and prediction of branch instructions. Accordingly, an instruction fetch structure which can achieve both high hit rates and low latency access is desired to achieve short clock cycle times as well as high fetch bandwidth.

SUMMARY OF THE INVENTION

The problems outlined above are in large part solved by a processor in accordance with the present invention. The processor employs a first instruction cache, a second instruction cache, and a fetch unit employing a fetch/prefetch method among the first and second instruction caches designed to provide high fetch bandwidth. The fetch unit selects a fetch address based upon previously fetched instructions (e.g. the existence or lack thereof of branch instructions within the previously fetched instructions) from a variety of fetch address sources. Depending upon the source of the fetch address, the fetch address is presented to one of the first and second instruction caches for fetching the corresponding instructions. If the first cache is selected to receive the fetch address, the fetch unit may select a prefetch address for presentation to the second cache. The prefetch address is selected from a variety of prefetch address sources and is presented to the second instruction cache. Instructions prefetched in response to the prefetch address are provided to the first instruction cache for storage.

In one embodiment, the first instruction cache may be a low latency, relatively small cache while the second instruction cache may be a higher latency, relatively large cache. Fetch addresses from many of the fetch address sources may be likely to hit in the first instruction cache. For example, branch target addresses corresponding to branch instructions having small displacements may be likely to hit in the first instruction cache, which stores the most recently accessed cache lines. Also, return addresses corresponding to return instructions may be likely to hit in the first instruction cache since the corresponding call instruction may have been recently executed. Other fetch addresses may be less likely to hit in the first instruction cache. For example, branch target addresses corresponding to branch instructions having large displacements or branch target addresses formed using an indirect method may be less likely to hit in the first instruction cache. Accordingly, these fetch addresses may be immediately fetched from the second instruction cache, instead of first attempting to fetch from the first instruction cache. The latency of attempting an access in the first instruction cache may thereby be avoided.

By generating prefetch addresses for the second instruction cache when the fetch address is conveyed to the first instruction cache, the fetch unit attempts to increase the likelihood that subsequent fetch addresses hit in the first instruction cache. Hits in the first instruction cache may provide the lowest latency, and hence may operate to improve the fetch bandwidth. Furthermore, in one embodiment the first instruction cache may provide multiple cache lines in response to fetch addresses. Accordingly, a relatively larger number of instructions may be provided per fetch than if only one cache line is provided. Fetch bandwidth may thereby be further improved.

Broadly speaking, the present invention contemplates a processor comprising a first instruction cache configured to store instructions; a second instruction cache configured to-store instructions; and a fetch unit. Coupled to the first instruction cache and the second instruction cache, the fetch unit is configured to generate a fetch address responsive to previously fetched instructions. The fetch unit is configured to select one of the first instruction cache and the second instruction cache from which to fetch instructions stored at the fetch address. Additionally, the fetch unit is configured to select the one of the first instruction cache and the second instruction cache dependent upon a source of the fetch address.

The present invention further contemplates a method for fetching instructions in a processor. A fetch address is selected from a plurality of fetch address sources responsive to previously fetched instructions. One of the first instruction cache within the processor and the second instruction cache within the processor is selected to receive the fetch address dependent upon which one of the plurality of fetch address sources is selected. Instructions are fetched from the selected one of the first instruction cache and the second instruction cache.

Moreover, the present invention contemplates a computer system, comprising a processor, a memory, and an input/output (I/O) device. The processor is configured to select a fetch address from one of a plurality of fetch address sources within the processor. The processor is further configured to fetch instructions from one of a first instruction cache and a second instruction cache included within the processor dependent upon which one of the plurality of address sources from which the fetch address is selected. Coupled to the processor, the memory is configured to store instructions. The processor is configured to fetch the instructions from memory if the instructions miss in the first instruction cache and the second instruction cache. Coupled to the processor, the I/O device is configured to communicate between the computer system and a second computer system to which the I/O device is coupled.

BRIEF DESCRIPTION OF THE DRAWINGS

Other objects and advantages of the invention will become apparent upon reading the following detailed description and upon reference to the accompanying drawings in which.

Figure 1:
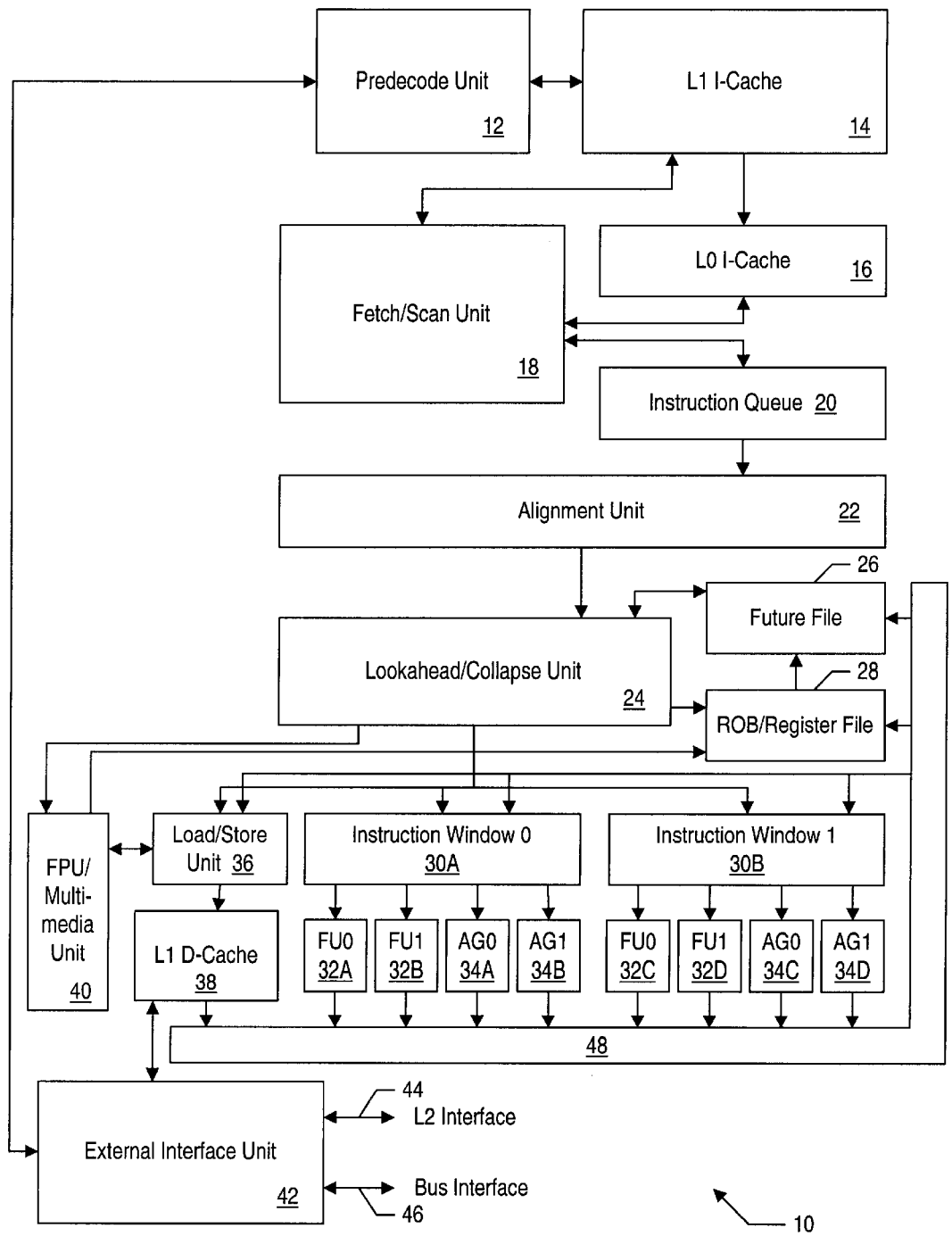
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to FIG. 1, a block diagram of one embodiment of a superscalar processor 10 is shown. Other embodiments are possible and contemplated. In the embodiment shown in FIG. 1, processor 10 includes a predecode unit 12, an L1 I-cache 14, an L0 I-cache 16, a fetch/scan unit 18, an instruction queue 20, an alignment unit 22, a lookahead/collapse unit 24, a future file 26, a reorder buffer/register file 28, a first instruction window 30A, a second instruction window 30B, a plurality of functional units 32A, 32B, 32C, and 32D, a plurality of address generation units 34A, 34B, 34C, and 34D, a load/store unit 36, an L1 D-cache 38, an FPU/multiinedia unit 40, and an external interface unit 42. Elements referred to herein by a particular reference number followed by various letters will be collectively referred to using the reference number alone. For example, functional units 32A, 32B, 32C, and 32D will be collectively referred to as functional units 32.

In the embodiment of FIG. 1, external interface unit 42 is coupled to predecode unit 12, L1 D-cache 38, an L2 interface 44, and a bus interface 46. Predecode unit 12 is further coupled to L1 I-cache 14. L1 I-cache 14 is coupled to L0 I-cache 16 and to fetch/scan unit 18. Fetch/scan unit 18 is also coupled to L0 1-cache 16 and to instruction queue 20. Instruction queue 20 is coupled to alignment unit 22, which is further coupled to lookahead/collapse unit 24. Lookahead/collapse unit 24 is further coupled to future file 26, reorder buffer/register file 28, load/store unit 36, first instruction window 30A, second instruction window 30B, and FPU/multimedia unit 40. FPU/multimedia unit 40 is coupled to load/store unit 36 and to reorder buffer/register file 28. Load/store unit 36 is coupled to L1 D-cache 38. First instruction window 30A is coupled to functional units 32A–32B and to address generation units 34A–34B. Similarly, second instruction window 30B is coupled to functional units 32C–32D and address generation units 34C–34D. Each of L1 D-cache 38, functional units 32, and address generation units 34 are coupled to a plurality of result buses 48 which are further coupled to load/store unit 36, first instruction window 30A, second instruction window 30B, reorder buffer/register file 28, and future file 26.

Generally speaking, processor 10 employs a pair of caches (L0 I-cache 16 and L1 I-cache 14) and a fetch/prefetch method employed within fetch/scan unit 18 to increase the fetch bandwidth achievable within processor 10. L0 I-cache 16 is a relatively small (as compared to L1 I-cache 14) cache and may therefore provide low latency access to instructions. L1 I-cache 14 is a larger cache and may therefore exhibit a higher latency than L0 I-cache 16, but may also exhibit a higher hit rate than L0 I-cache 16. Fetch/scan unit 18 is configured to generate a fetch address based upon a variety of fetch address sources and/or the instructions previously fetched by processor 10 in response to previously generated fetch address. Depending upon the source of the fetch address, fetch/scan unit 18 fetches the corresponding instructions from either L0 I-cache 16 or L1 I-cache 14. Many of the most frequently selected sources of fetch addresses are presented to L0 I-cache 16 under the assumption that a cache hit in L0 I-cache 16 may occur. On the other hand, certain sources of fetch addresses may generally be less likely to hit in L0 I-cache 16. For these sources of fetch addresses, fetch/scan unit 18 routes the fetch address to L1 I-cache 14 without first accessing L0-cache 16. Additionally, fetch/scan unit 18 employs a prefetch algorithm to attempt to prefetch instructions likely to be fetched (based upon the current fetch address) from L1 I-cache 14 to L0 I-cache 16, if L0 I-cache 16 is selected to receive the fetch address generated by fetch/scan unit 18. By aggressively prefetching from L1 I-cache 14 to L0 I-cache 16, many of the more frequently used sources of fetch addresses may be more likely to hit in L0 I-cache 16.

Advantageously, low latency and high bandwidth instruction fetch may be achievable from the combination of L0 I-cache 16, L1 I-cache 14, and fetch/scan unit 18. Performance of processor 10 may be increased as a result of the numerous instructions which may be available for simultaneous dispatch and issue within processor 10. As used herein, a fetch address refers to an address generated responsive to previously fetched instructions, wherein the instructions stored at the fetch address are predicted to be the next instructions after the previously fetched instructions within the instruction sequence being executed. On the other hand, a prefetch address refers to an address generated responsive to previously fetched instructions, wherein the instructions stored at the prefetch address are predicted to be within the instruction sequence being executed but which are not predicted to be the next instructions after the previously fetched instructions within the instruction sequence. Instead, the instructions stored at the prefetch address are predicted to be subsequent to the next instructions after the previously fetched instructions within the instruction sequence.

Predecode unit 12 receives instruction bytes fetched by external interface unit 42 and predecodes the instruction bytes prior to their storage within L1 I-cache 14. Predecode information generated by predecode unit 12 is stored in L1 I-cache 14 as well. Generally, predecode information is provided to aid in the identification of instruction features which may be useful during the fetch and issue of instructions but which may be difficult to generate rapidly during the fetch and issue operation. The term "predecode", as used herein, refers to decoding instructions to generate predecode information which is later stored along with the instruction bytes being decoded in an instruction cache (e.g. L1 I-cache 14 and/or L0 I-cache 16).

In one embodiment, processor 10 employs two bits of predecode information per instruction byte. One of the bits, referred to as the "start bit", indicates whether or not the instruction byte is the initial byte of an instruction. When a group of instruction bytes is fetched, the corresponding set of start bits identifies the boundaries between instructions within the group of instruction bytes. Accordingly, multiple instructions may be concurrently selected from the group of instruction bytes by scanning the corresponding start bits. While start bits are used to locate instruction boundaries by identifying the initial byte of each instruction, end bits could alternatively be used to locate instruction boundaries by identifying the final byte of each instruction.

The second predecode bit used in this embodiment, referred to as the "control transfer" bit, identifies which instructions are branch instructions. The control transfer bit corresponding to the initial byte of an instruction indicates whether or not the instruction is a branch instruction. The control transfer bit corresponding to subsequent bytes of the instruction is a don't care except for relative branch instructions having a small displacement field. According to one particular embodiment, the small displacement field is an 8 bit field. Generally, a "small displacement field" refers to a displacement field having fewer bits than the target address generated by branch instructions. For relative branch instructions having small displacement fields, the control transfer bit corresponding to the displacement byte is used as described below.

In addition to generating predecode information corresponding to the instruction bytes, predecode unit 12 is configured to recode the displacement field of relative branch instructions to actually store the target address in the present embodiment. In other words, predecode unit 12 adds the displacement of the relative branch instruction to the address corresponding to the relative branch instruction as defined by the instruction set employed by processor 10. The resulting target address is encoded into the displacement field as a replacement for the displacement, and the updated displacement field is stored into L1 I-cache 14 instead of the original displacement field. Target address generation is simplified by precomputing relative target addresses, and hence the branch prediction mechanism may operate more efficiently.

In one embodiment of processor 10 which employs the x86 instruction set, predecode unit 12 is configured to recode eight bit and 32 bit displacement fields. The 32 bit displacement fields may store the entirety of the target address. On the other hand, the eight bit displacement field is encoded. More particularly, the eight bit displacement field and corresponding control transfer predecode bit is divided into a cache line offset portion and a relative cache line portion. The cache line offset portion is the cache line offset portion of the target address. The relative cache line portion defines the cache line identified by the target address (the "target cache line") in terms of a number of cache lines above or below the cache line storing the relative branch instruction. A first cache line is above a second cache line if each byte within the first cache line is stored at an address which is numerically greater than the addresses at which the bytes within the second cache line are stored. Conversely, a first cache line is below the second cache line if each byte within the first cache line is stored at an address which is numerically less than the addresses at which the bytes within a second cache line are stored. A signed eight bit displacement specifies an address which is +/− 128 bytes of the address corresponding to the branch instruction. Accordingly, the number of above and below cache lines which can be reached by a relative branch instruction having an eight bit displacement is limited. The relative cache line portion encodes this limited set of above and below cache lines. Generally, branch instructions having a small displacement field have displacements within a predefined range, whereas larger displacement fields may store values outside the predefined range.

Tables 1 and 2 below illustrates an exemplary encoding of the predecode information corresponding to a byte in accordance with one embodiment of processor 10.

TABLE 1

Predecode Encoding

| Start Bit | Control Transfer Bit | Meaning |
|---|---|---|
| 1 | 0 | Start byte of an instruction which is not a branch. |
| 1 | 1 | Start byte of a branch instruction. |
| 0 | x | Not an instruction boundary. Control Transfer Bit corresponding to displacement is used on 8-bit relative branches to encode target address as shown in Table 2 below. |

TABLE 2

Target Address Encoding

| Control Transfer Bit | Displacement Byte Most Significant Bits (binary) | Meaning |
|---|---|---|
| 0 | 00 | Within Current Cache Line |
| 0 | 01 | One Cache Line Above |
| 0 | 10 | Two Cache Lines Above |
| 1 | 01 | One Cache Line Below |
| 1 | 10 | Two Cache Lines Below |

Note: Remaining displacement byte bits are the offset within the target cache line. Control Transfer Bit is effectively a direction, and the most significant bits of the displacement byte are the number of cache lines.

Predecode unit 12 conveys the received instruction bytes and corresponding predecode information to L1 I-cache 14 for storage. L1 I-cache 14 is a high speed cache memory for storing instruction bytes and predecode information. L1 I-cache 14 may employ any suitable configuration, including direct mapped and set associative configurations. In one particular embodiment, L1 I-cache 14 is a 128 KB, two way set associative cache employing 64 byte cache lines. L1 I-cache 14 includes additional storage for the predecode information corresponding to the instruction bytes stored therein. The additional storage is organized similar to the instruction bytes storage. As used herein, the term "cache line" refers to the unit of allocation of storage in a particular cache. Generally, the bytes within a cache line are manipulated (i.e. allocated and deallocated) by the cache as a unit.

In one embodiment, L1 I-cache 14 is linearly addressed and physically tagged. A cache is linearly addressed if at least one of the address bits used to index the cache is a linear address bit which is subsequently translated to a physical address bit. The tags of a linearly address/physically tagged cache include each translated bit in addition to the bits not used to index. As specified by the x86 architecture, instructions are defined to generate logical addresses which are translated through a segmentation translation mechanism to a linear address and further translated through a page translation mechanism to a physical address. It is becoming increasingly common to employ flat addressing mode, in which the logical address and corresponding linear address are equal. Processor 10 may be configured to assume flat addressing mode. Accordingly, fetch addresses, target addresses, etc. as generated by executing instructions are linear addresses. In order to determine if a hit is detected in L1 I-cache 14, the linear address presented thereto by fetch/scan unit 18 is translated using a translation lookaside buffer (TLB) to a corresponding physical address which is compared to the physical tags from the indexed cache lines to determine a hit/miss. When flat addressing mode is not used, processor 10 may still execute code but additional clock cycles may be used to generate linear addresses from logical addresses.

L0 I-cache 16 is also a high speed cache memory for storing instruction bytes. Because L1 I-cache 14 is large, the access time of L1 I-cache 14 may be large. In one particular embodiment, L1 I-cache 14 uses a two clock cycle access time. In order to allow for single cycle fetch access, L0 I-cache 16 is employed. L0 I-cache 16 is comparably smaller than L1 I-cache 14, and hence may support a more rapid access time. In one particular embodiment, L0 I-cache 16 is a 512 byte fully associative cache. Similar to L1 I-cache 14, L0 I-cache 16 is configured to store cache lines of instruction bytes and corresponding predecode information (e.g. 512 bytes stores eight 64 byte cache lines and corresponding predecode data is stored in additional storage). In one embodiment, L0 I-cache 16 may be linearly addressed and linearly tagged.

Fetch/scan unit 18 is configured to generate fetch addresses for L0 I-cache 16 and fetch or prefetch addresses for L1 I-cache 14. Instructions fetched from L0 I-cache 16 are scanned by fetch/scan unit 18 to identify instructions for dispatch as well as to locate branch instructions and to form branch predictions corresponding to the located branch instructions. Instruction scan information and corresponding instruction bytes are stored into instruction queue 20 by fetch/scan unit 18. Additionally, the identified branch instructions and branch predictions are used to generate subsequent fetch addresses for L0 I-cache 16.

Fetch/scan unit 18 employs a prefetch algorithm to attempt to prefetch cache lines from L1 I-cache 14 to L0 I-cache 16 prior to the prefetched cache lines being fetched by fetch/scan unit 18 for dispatch into processor 10. Any suitable prefetch algorithm may be used. One embodiment of the prefetch algorithm is set forth in more detail below.

Fetch/scan unit 18 employs an aggressive branch prediction mechanism in attempt to fetch larger "runs" of instructions during a clock cycle. As used herein, a "run" of instructions is a set of one or more instructions predicted to be executed in the sequence specified within the set. For example, fetch/scan unit 18 may fetch runs of 24 instruction bytes from L0 I-cache 16. Each run is divided into several sections which fetch/scan unit 18 scans in parallel to identify branch instructions and to generate instruction scan information for instruction queue 20. According to one embodiment, fetch/scan unit 18 attempts to predict up to two branch instructions per clock cycle in order support large instruction runs.

Instruction queue 20 is configured to store instruction bytes provided by fetch/scan unit 18 for subsequent dispatch. Instruction queue 20 may operate as a first-in, first-out (FIFO) buffer. In one embodiment, instruction queue 20 is configured to store multiple entries, each entry comprising: a run of instructions, scan data identifying up to five instructions within each section of the run, and addresses corresponding to each section of the run. Additionally, instruction queue 20 may be configured to select up to six instructions within up to four consecutive run sections for presentation to alignment unit 22. Instruction queue 20 may, for example, employ 2–3 entries.

Alignment unit 22 is configured to route instructions identified by instruction queue 20 to a set of issue positions within lookahead/collapse unit 24. In other words, alignment unit 22 selects the bytes which form each instruction from the run sections provided by instruction queue 20 responsive to the scan information provided by instruction queue 20. The instructions are provided into the issue positions in program order (i.e. the instruction which is first in program order is provided to the first issue position, the second instruction in program order is provided to the second issue position, etc.).

Lookahead/collapse unit 24 decodes the instructions provided by alignment unit 22. FPU/multimedia instructions detected by lookahead/collapse unit 24 are routed to FPU/multimedia unit 40. Other instructions are routed to first instruction window 30A, second instruction window 30B, and/or load/store unit 36. In one embodiment, a particular instruction is routed to one of first instruction window 30A or second instruction window 30B based upon the issue position to which the instruction was aligned by alignment unit 22. According to one particular embodiment, instructions from alternate issue positions are routed to alternate instruction windows 30A and 30B. For example, instructions from issue positions zero, two, and four may be routed to the first instruction window 30A and instructions from issue positions one, three, and five may be routed to the second instruction window 30B. Instructions which include a memory operation are also routed to load/store unit 36 for access to L1 D-cache 38.

Additionally, lookahead/collapse unit 24 attempts to generate lookahead addresses or execution results for certain types of instructions. Lookahead address/result generation may be particularly beneficial for embodiments employing the x86 instruction set. Because of the nature the x86 instruction set, many of the instructions in a typical code sequence are versions of simple moves. One reason for this feature is that x86 instructions include two operands, both of which are source operands and one of which is a destination operand. Therefore, one of the source operands of each instruction is overwritten with an execution result. Furthermore, the x86 instruction set specifies very few registers for storing register operands. Accordingly, many instructions are moves of operands to and from a stack maintained within memory. Still further, many instruction dependencies are dependencies upon the ESP/EBP registers and yet many of the updates to these registers are increments and decrements of the previously stored values.

To accelerate the execution of these instructions, lookahead/collapse unit 24 generates lookahead copies of the ESP and EBP registers for each of instructions decoded during a clock cycle. Additionally, lookahead/collapse unit 24 accesses future file 26 for register operands selected by each instruction. For each register operand, future file 26 may be storing either an execution result or a tag identifying a reorder buffer result queue entry corresponding to the most recent instruction having that register as a destination operand.

In one embodiment, lookahead/collapse unit 24 attempts to perform an address calculation for each instruction which: (i) includes a memory operand; and (ii) register operands used to form the address of the memory operand are available from future file 26 or lookahead copies of ESP/EBP. Additionally, lookahead/collapse unit 24 attempts to perform a result calculation for each instruction which: (i) does not include a memory operand; (ii) specifies an add/subtract operation (including increment and decrement); and (iii) register operands are available from future file 26 or lookahead copies of ESP/EBP. In this manner, many simple operations may be completed prior to instructions being sent to instruction windows 30A–30B.

Lookahead/collapse unit 24 detects dependencies between a group of instructions being dispatched and collapses any execution results generated therein into instructions dependent upon those instruction results. Additionally, lookahead/collapse unit 24 updates future file 26 with the lookahead execution results. Instruction operations which are completed by lookahead/collapse unit 24 (i.e. address generations and/or instruction results are generated and load/store unit 36 or future file 26 and the result queue are updated) are not dispatched to instruction windows 30A–30B.

Lookahead/collapse unit 24 allocates a result queue entry in reorder buffer/register file 28 for each instruction dispatched. In one particular embodiment, reorder buffer/register file 28 includes a result queue organized in a line-oriented fashion in which storage locations for execution results are allocated and deallocated in lines having enough storage for execution results corresponding to a maximum number of concurrently dispatchable instructions. If less than the maximum number of instructions are dispatched, then certain storage locations within the line are empty. Subsequently dispatched instructions use the next available line, leaving the certain storage locations empty. In one embodiment, the result queue includes 40 lines, each of which may store up to six execution results corresponding to concurrently dispatched instructions. Execution results are retired from the result queue in order into the register file included within reorder buffer/register file 28. Additionally, the reorder buffer handles branch is predictions, transmitting the corrected fetch address generated by the execution of the ranch instruction to fetch/scan unit 18. Similarly, instructions which generate other exceptions are handled within the reorder buffer. Results corresponding to instructions subsequent to the exception-generating instruction are discarded by the reorder buffer. The register file comprises a storage location for each architected register. For example, the x86 instruction set defines 8 architected registers. The register file for such an embodiment includes eight storage locations. The register file may further include storage locations used as temporary registers by a microcode unit in embodiments employing microcode units.

Future file 26 maintains the speculative state of each architected register as instructions are dispatched by lookahead/collapse unit 24. As an instruction having a register destination operand is decoded by lookahead/collapse unit 24, the tag identifying the storage location within the result queue portion of reorder buffer/register file 28 assigned to the instruction is stored into the future file 26 storage location corresponding to that register. When the corresponding execution result is provided, the execution result is stored into the corresponding storage location (assuming that a subsequent instruction which updates the register has not been dispatched).

It is noted that, in one embodiment, a group of up to six instructions is selected from instruction queue 20 and moves through the pipeline within lookahead/collapse unit 24 as a unit. If one or more instructions within the group generates a stall condition, the entire group stalls. An exception to this rule is if lookahead/collapse unit 24 generates a split line condition due to the number of ESP updates within the group). Such a group of instructions is referred to as a "line" of instructions lierein.

Instruction windows 30 receive instructions from lookahead/collapse unit 24. Instruction windows 30 store the instructions until the operands corresponding to the instructions are received, and then select the instructions for execution. Once the address operands of an instruction including a memory operation have been received, the instruction is transmitted to one of the address generation units 34. Address generation units 34 generate an address from the address operands and forward the address to load/store unit 36. On the other hand, once the execution operands of an instruction have been received, the instruction is transmitted to one of the functional units 32 for execution. In one embodiment, each integer window 30A–30B includes 25 storage locations for instructions. Each integer window 30A–30B is configured to select up to two address generations and two functional unit operations for execution each clock cycle in the address generation units 34 and fiuntional units 32 connected thereto. In one embodiment, instructions fetched from L0 I-cache 16 remain in the order fetched until stored into one of instruction windows 30, at which point the instructions may be executed out of order.

In embodiments of processor 10 employing the x86 instruction set, an instruction may include implicit memory operations for load/store unit 36 as well as explicit functional operations for functional units 32. Instructions having no memory operand do not include any memory operations, and are handled by functional units 32. Instructions having a source memory operand and a register destination operand include an implicit load memory operation handled by load/store unit 36 and an explicit functional operation handled by functional units 32. Instructions having a memory source/destination operand include implicit load and store memory operations handled by load/store unit 36 and an explicit functional operation handled by functional units 32. Finally, instructions which do not have an explicit functional operation are handled by load/store unit 36. Each memory operation results in an address generation handled either by lookahead/collapse unit 24 or address generation units 34. Memory operations and instructions (i.e. functional operations) may be referred to herein separately, but may be sourced from a single instruction.

Address generation units 34 are configured to perform address generation operations, thereby generating addresses for memory operations in load/store unit 36. The generated addresses are forwarded to load/store unit 36 via result buses 48. Functional units 32 are configured to perform integer arithmetic/logical operations and execute branch instructions. Execution results are forwarded to future file 26, reorder buffer/register file 28, and instruction windows 30A–30B via result buses 48. Address generation units 34 and functional units 32 convey the result queue tag assigned to the instruction being executed upon result buses 48 to identify the instruction being executed. In this manner, future file 26, reorder buffer/register file 28, instruction windows 30A–30B, and load/store unit 36 may identify execution results with the corresponding instruction. FPU/multimedia unit 40 is configured to execute floating point and multimedia instructions.

Load/store unit 36 is configured to interface with L1 D-cache 38 to perform memory operations. A memory operation is a transfer of data between processor 10 and an external memory. The memory operation may be an explicit instruction, or may be implicit portion of an instruction which also includes operations to be executed by functional units 32. Load memory operations specify a transfer of data from external memory to processor 10, and store memory operations specify a transfer of data from processor 10 to external memory. If a hit is detected for a memory operation within L1 D-cache 38, the memory operation is completed therein without access to external memory. Load/store unit 36 may receive addresses for memory operations from lookahead/collapse unit 24 (via lookahead address calculation) or from address generation units 34. In one embodiment, load/store unit 36 is configured perform up to three memory operations per clock cycle to L1 D-cache 38. For this embodiment, load/store unit 36 may be configured to buffer up to 30 load/store memory operations which have not yet accessed D-cache 38. The embodiment may further be configured to include a 96 entry miss buffer for buffering load memory operations which miss D-cache 38 and a 32 entry store data buffer. Load/store unit 36 is configured to perform memory dependency checking between load and store memory operations.

L1 D-cache 38 is a high speed cache memory for storing data. Any suitable configuration may be used for L1 D-cache 38, including set associative and direct mapped configurations. In one particular embodiment, L1 D-cache 38 is a 128 KB two way set associative cache employing 64 byte lines. L1 D-cache 38 may be organized as, for example, 32 banks of cache memory per way. Additionally, L1 D-cache 38 may be a linearly addressed/physically tagged cache employing a TLB similar to L1 I-cache 14.

External interface unit 42 is configured to transfer cache lines of instruction bytes and data bytes into processor 10 in response to cache misses. Instruction cache lines are routed to predecode unit 12, and data cache lines are routed to L1 D-cache 38. Additionally, external interface unit 42 is configured to transfer cache lines discarded by L1 D-cache 38 to memory if the discarded cache lines have been modified to processor 10. As shown in FIG. 1, external interface unit 42 is configured to interface to an external L2 cache via L2 interface 44 as well as to interface to a computer system via bus interface 46. In one embodiment, bus interface unit 46 comprises an EV/6 bus interface.

Figure 2:
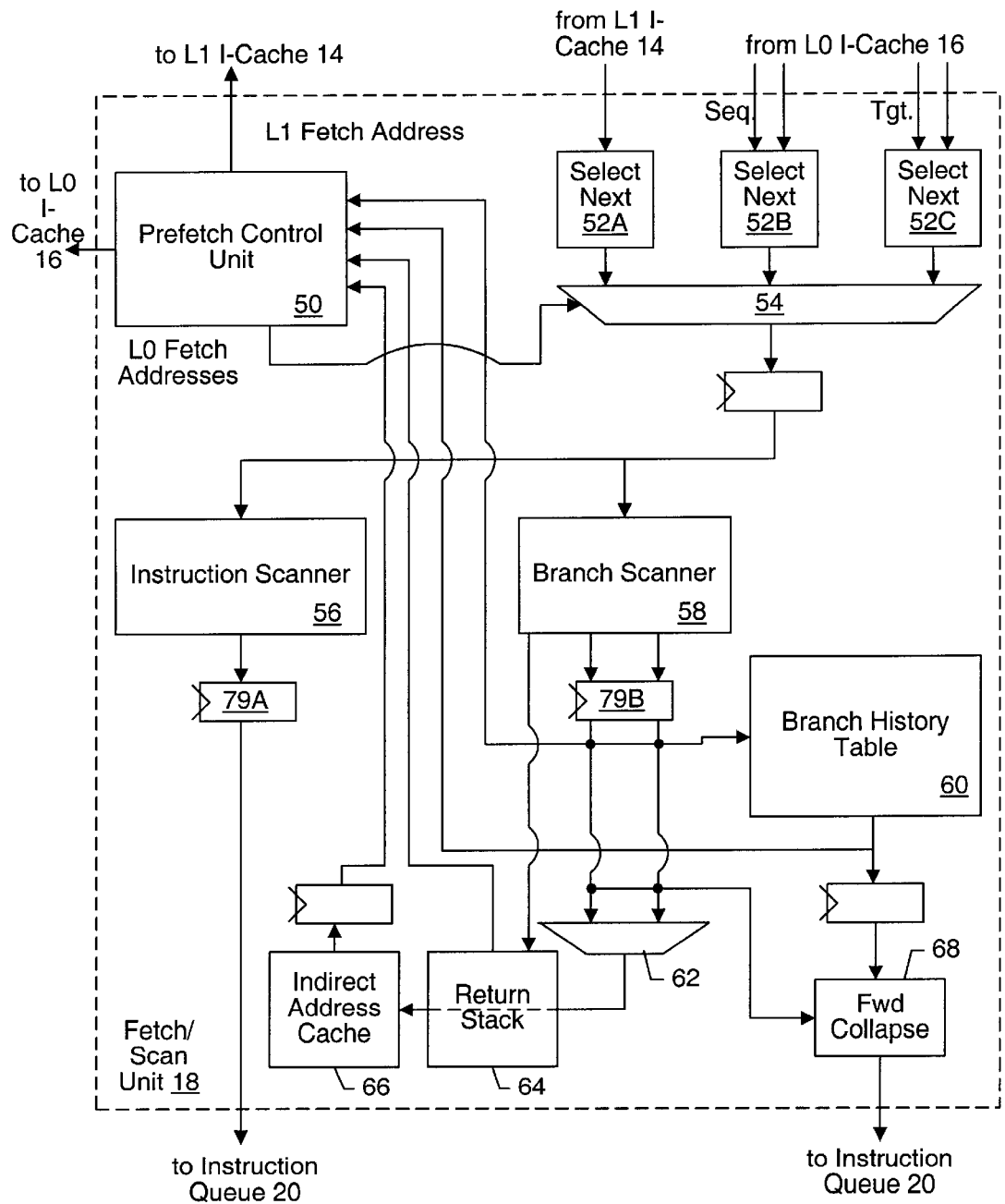
FIG. 2 is a block diagram of one embodiment of a fetch/scan unit shown in FIG. 1.

Turning now to FIG. 2, a block diagram of one embodiment of fetch/scan unit 18 is shown. Other embodiments are possible and contemplated. As shown in FIG. 2, fetch/scan unit 18 includes a fetch control unit 50, a plurality of select next blocks 52A–52C, an instruction select multiplexor (mux) 54, an instruction scanner 56, a branch scanner 58, a branch history table 60, a branch select mux 62, a return stack 64, an indirect address cache 66, and a forward collapse unit 68. Fetch control unit 50 is coupled to L1 I-cache 14, L0 I-cache 16, indirect address cache 66, return stack 64, branch history table 60, branch scanner 58, and instruction select mux 54. Select next block 52A is coupled to L1 I-cache 14, while select next blocks 52B–52C are coupled to L0 I-cache 16. Each select next block 52 is coupled to instruction select mux 54, which is further coupled to branch scanner 58 and instruction scanner 56. Instruction scanner 56 is coupled to instruction queue 20. Branch scanner 58 is coupled to branch history table 60, return stack 64, and branch select mux 62. Branch select mux 62 is coupled to indirect address cache 66. Branch history table 60 and branch scanner 58 are coupled to forward collapse unit 68, which is coupled to instruction queue 20.

Fetch control unit 50 receives branch prediction information (including target addresses and taken/not taken predictions) from branch scanner 58, branch history table 60, return stack 64, and indirect address cache 66. Responsive to the branch prediction information, fetch control unit 50 generates fetch addresses for L0 I-cache 16 and a fetch or a prefetch address for L1 I-cache 14. In one embodiment, fetch control unit 50 generates two fetch addresses for L0 I-cache 16. The first fetch address is selected as the target address corresponding to the first branch instruction identified by branch scanner 58 (if any). The second fetch address is the sequential address to the fetch address selected in the previous clock cycle (i.e. the fetch address corresponding to the run selected by instruction select mux 54).

L0 I-cache 14 provides the cache lines (and predecode information) corresponding to the two fetch addresses, as well as the cache lines (and predecode information) which are sequential to each of those cache lines, to select next blocks 52B–52C. More particularly, select next block 52B receives the sequential cache line corresponding to the sequential address and the next incremental cache line to the sequential cache line. Select next block 52C receives the target cache line corresponding to the target address as well as the cache line sequential to the target cache line. Additionally, select next blocks 52B–52C receive the offset portion of the corresponding fetch address. Select next blocks 52B–52C each select a run of instruction bytes (and corresponding predecode information) from the received cache lines, beginning with the run section including the offset portion of the corresponding fetch address. Since the offset portion of each fetch address can begin anywhere within the cache line, the selected run may included portions of the fetched cache line and the sequential cache line to the fetched cache line. Hence, both the fetched cache line and the sequential cache line are received by select next blocks 52B–52C.

Similarly, select next block 52A receives a prefetched cache line (and corresponding predecode information) from L1 I-cache 14 and selects an instruction run therefrom. Since one cache line is prefetched from L1 I-cache 14, the run selected therefrom may comprise less than a full run if the offset portion of the prefetch address is near the end of the cache line. It is noted that the fetch cache lines from L0 I-cache 16 may be provided in the same clock cycle as the corresponding addresses are generated by fetch control unit 50, but the prefetch cache line may be a clock cycle delayed due to the larger size and slower access time of L1 I-cache 14. In addition to providing the prefetched cache line to select next block 52A, L1 I-cache 14 provides the prefetched cache line to L0 I-cache 16. If the prefetched cache line is already stored within L0 I-cache 16, L0 I-cache 16 may discard the prefetched cache line. However, if the prefetched cache line is not already stored in L0 I-cache 14, the prefetched cache line is stored into L0 I-cache 16. In this manner, cache lines which may be accessed presently are brought into L0 I-cache 16 for rapid access therefrom. According to one exemplary embodiment, L0 I-cache 16 comprises a fully associative cache structure of eight entries. A fully associative structure may be employed due to the relatively small number of cache lines included in L0 I-cache 16. Other embodiments may employ other organizations (e.g. set associative or direct-mapped).

Fetch control unit 50 selects the instruction run provided by one of select next blocks 52 in response to branch prediction information by controlling instruction select mux 54. As will be explained in more detail below, fetch control unit 50 receives (in the present embodiment) target addresses from branch scanner 58, return stack 64, and indirect address cache 66 early in the clock cycle as well as at least a portion of the opcode byte of the first branch instruction identified by branch scanner 58. Fetch control unit 50 decodes the portion of the opcode byte to select the target address to be fetched from L0 I-cache 16 from the various target address sources and provides the selected target address to L0 I-cache 16. In parallel, the sequential address to the fetch address selected in the previous clock cycle (either the target address or the sequential address from the previous clock cycle, depending upon the branch prediction from the previous clock cycle) is calculated and provided to L0 I-cache 16. Branch prediction information (i.e. taken or not taken) is provided by branch history table 60 late in the clock cycle. If the branch instruction corresponding to the target address fetched from L0 I-cache 16 is predicted taken, then fetch control unit 50 selects the instruction run provided by select next block 52C. On the other hand, if the branch instruction is predicted not taken, then the instruction run selected by select next block 52B is selected. The instruction run provided by select next block 52A is selected if a predicted fetch address missed L0 I-cache 16 in a previous clock cycle and was fetched from L1 I-cache 14. Additionally, the instruction run from L1 I-cache 14 is selected if the instruction run was fetched responsive to a branch instruction have a 32 bit displacement or indirect target address generation or an L0 I-cache miss was fetched.

The selected instruction run is provided to instruction scanner 56 and branch scanner 58. Instruction scanner 56 scans the predecode information corresponding to the selected instruction run to identify instructions within the instruction run. More particularly in one embodiment, instruction scanner 56 scans the start bits corresponding to each run section in parallel and identifies up to five instructions within each run section. Pointers to the identified instructions (offsets within the run section) are generated. The pointers, instruction bytes, and addresses (one per run section) are conveyed by instruction scanner 56 to instruction queue 20. If a particular run section includes more than five instructions, the information corresponding to run sections subsequent to the particular run section is invalidated and the particular run section and subsequent run sections are rescanned during the next clock cycle.

Branch scanner 58 scans the instruction run in parallel with instruction scanner 56. Branch scanner 58 scans the start bits and control transfer bits of the instruction run to identify the first two branch instructions within the instruction run. As described above, a branch instruction is identified by the control transfer bit corresponding to the start byte of an instruction (as identified by the start bit) being set. Upon locating the first two branch instructions, branch scanner 58 assumes that the instructions are relative branch instructions and selects the corresponding encoded target addresses from the instruction bytes following the start byte of the branch instruction. For embodiments employing the x86 instruction set, a nine bit target address (the displacement byte as well as the corresponding control transfer bit) is selected, and a 32 bit target address is selected as well. Furthermore, at least a portion of the opcode byte identified by the start and control transfer bits is selected. The target addresses and opcode bytes are routed to fetch control unit 50 for use in selecting a target address for fetching from L0 I-cache 16. The fetch addresses of each branch instruction (determined from the fetch address of the run section including each branch instruction and the position of the branch instruction within the section) are routed to branch history table 60 for selecting a taken/not-taken prediction corresponding to each branch instruction. Furthermore, the fetch addresses corresponding to each branch instruction are routed to branch select mux 62, which is further routed to indirect address cache 66. The target address of each branch instruction is routed to forward collapse unit 68. According to one embodiment, branch scanner 58 is configured to scan each run section in parallel for the first two branch instructions and then to combine the scan results to select the first two branch instructions within the run.

Branch scanner 58 may further be configured to determine if a subroutine call instruction is scanned during a clock cycle. Branch scanner 58 may forward the fetch address of the next instruction following the detected subroutine call instruction to return stack 64 for storage therein.

In one embodiment, if there are more than two branch instructions within a run, the run is scanned again during a subsequent clock cycle to identify the subsequent branch instruction.

The fetch addresses of the identified branch instructions are provided to branch history table 60 to determine a taken/not taken prediction for each instruction. Branch history table 60 comprises a plurality of taken/not-taken predictors corresponding to the previously detected behavior of branch instructions. One of the predictors is selected by maintaining a history of the most recent predictions and exclusive ORing those most recent predictions with a portion of the fetch addresses corresponding to the branch instructions. The least recent (oldest) prediction is exclusive ORed with the most significant bit within the portion of the fetch address, and so forth through the most recent prediction being exclusive ORed with the least significant bit within the portion of the fetch address. Since two predictors are selected per clock cycle, the predictor corresponding to the second branch instruction is dependent upon the prediction of the first branch instruction (for exclusive ORing with the least significant bit of the corresponding fetch address). Branch history table 60 provides the second predictor by selecting both of the predictors which might be selected (i.e. the predictor that would be selected if the first branch instruction is predicted not-taken and the predictor that would be selected if the first branch instruction is predicted taken) and then selecting one of the two predictors based on the actual prediction selected for the first branch instruction.

Branch history table 60 receives information regarding the execution of branch instructions from functional units 32A–32D. The history of recent predictions corresponding to the executed branch instruction as well as the fetch address of the executed branch instruction are provided for selecting a predictor to update, as well as the taken/not taken result of the executed branch instruction. Branch history table 60 selects the corresponding predictor and updates the predictor based on the taken/not taken result. In one embodiment, the branch history table stores a bimodal counter. The bimodal counter is a saturating counter which saturates at a minimum and maximum value (i.e. subsequent decrements of the minimum value and increments of the maximum value cause no change in the counter). Each time a branch instruction is taken, the corresponding counter is incremented and each time a branch instruction is not taken,.the corresponding counter is decremented. The most significant bit of the counter indicates the taken/not taken prediction (e.g. taken if set, not taken if clear). In one embodiment, branch history table 60 stores 64K predictors and maintains a history of the 16 most recent predictions. Each clock cycle, the predictions selected during the clock cycle are shifted into the history and the oldest predictions are shifted out of the history.

Return stack 64 is used to store the return addresses corresponding to detected subroutine call instructions. Return stack 64 receives the fetch address of a subroutine call instruction from branch scanner 58. The address of the byte following the call instruction (calculated from the fetch address provided to return stack 64) is placed at the top of return stack 64. Return stack 64 provides the address stored at the top of the return stack to fetch control unit 50 for selection as a target address if a return instruction is detected by branch scanner 58 and fetch control unit 50. In this manner, each return instruction receives as a target address the address corresponding to the most recently detected call instruction. Generally in the x86 instruction set, a call instruction is a control transfer instruction which specifies that the sequential address to the call instruction be placed on the stack defined by the x86 architecture. A return instruction is an instruction which selects the target address from the top of the stack. Generally, call and return instructions are used to enter and exit subroutines within a code sequence (respectively). By placing addresses corresponding to call instructions in return stack 64 and using the address at the top of return stack 64 as the target address of return instructions, the target address of the return instruction may be correctly predicted. In one embodiment, return stack 64 may comprise 16 entries.

Indirect address cache 66 stores target addresses corresponding to previous executions of indirect branch instructions. The fetch address corresponding to an indirect branch instruction and the target address corresponding to execution of the indirect branch instruction are provided by functional units 32A–32D to indirect address cache 66. Indirect address cache 66 stores the target addresses indexed by the corresponding fetch addresses. Indirect address cache 66 receives the fetch address selected by branch select mux 62 (responsive to detection of an indirect branch instruction) and, if the fetch address is a hit in indirect address cache 66, provides the corresponding target address to fetch control unit 50. In one embodiment, indirect address cache 66 may comprise 32 entries.

According to one contemplated embodiment, if indirect address cache 66 detects a miss for a fetch address, indirect address cache 66 may be configured to select a target address to provide from one of the entries. In this manner, a "guess" at a branch target is provided in case an indirect branch instruction is decoded. Fetching from the guess may be performed rather than awaiting the address via execution of the indirect branch instruction. Alternatively, another contemplated embodiment awaits the address provided via execution of the indirect branch instruction.

It is noted that, if an encoded target address is selected, the actual target address may be presented to L0 I-cache 16. Fetch control unit 50 may be configured to precalculate each of the possible above/below target addresses and select the correct address based on the encoded target address. Alternatively, fetch control unit 50 may record which L0 I-cache storage locations are storing the above and below cache lines, and select the storage locations directly without a tag compare.

Forward collapse unit 68 receives the target addresses and positions within the instruction run of each selected branch instruction as well as the taken/not taken predictions. Forward collapse unit 68 determines which instructions within the run should be cancelled based upon the received predictions. If the first branch instruction is predicted taken and is backward (i.e. the displacement is negative), all instructions subsequent to the first branch instruction are cancelled. If the first branch instruction is predicted taken and is forward but the displacement is small (e.g. within the instruction run), the instructions which are between the first branch instruction and the target address are cancelled. The second branch instruction, if still within the run according to the first branch instruction's prediction, is treated similarly. Cancel indications for the instructions within the run are set to instruction queue 20.

Figure 3:
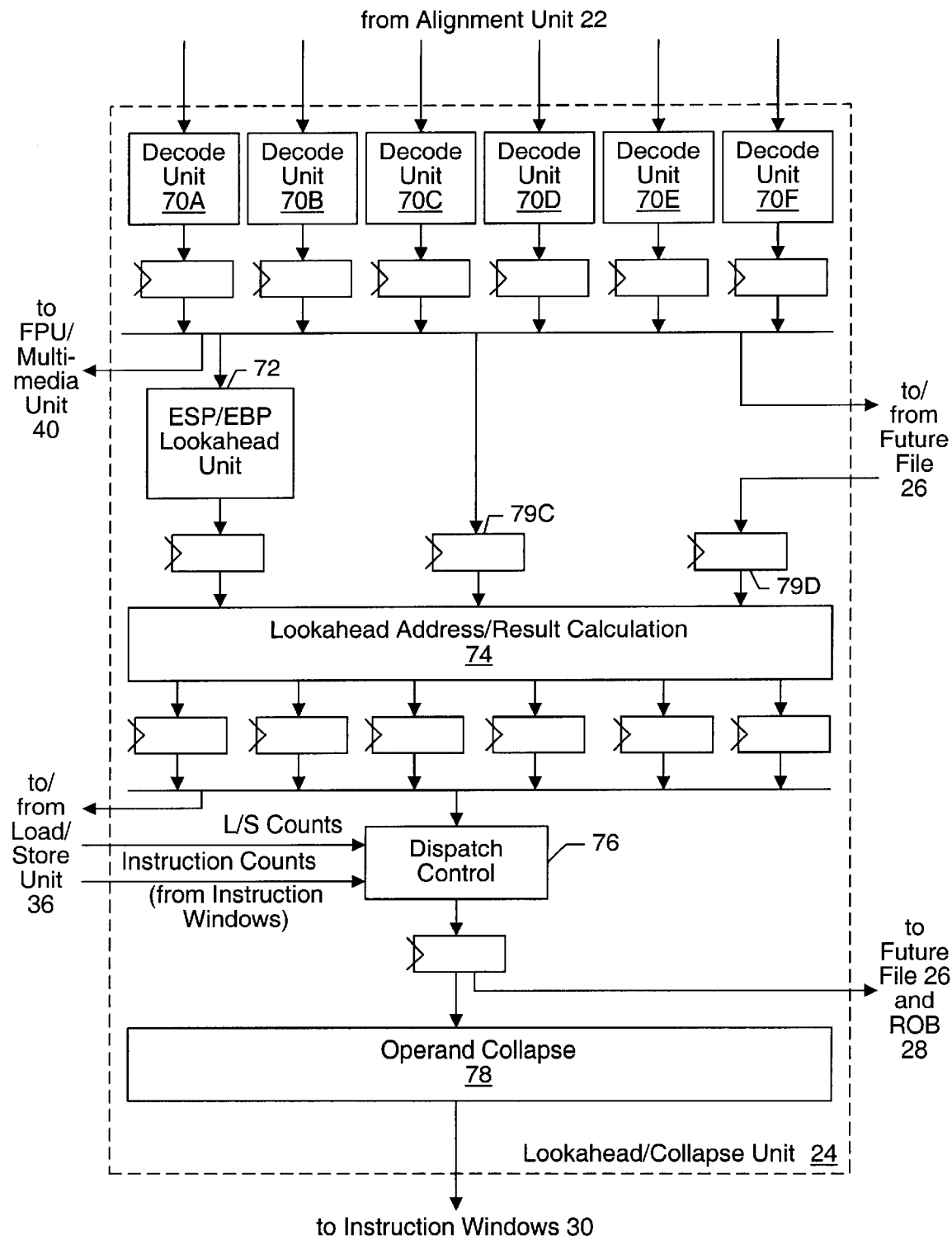
FIG. 3 is a block diagram of one embodiment of a lookahead/collapse unit shown in FIG. 1.

Turning now to FIG. 3, a block diagram of one embodiment of lookahead/collapse unit 24 is shown. Other embodiments are possible and contemplated. As shown in FIG. 3, lookahead/collapse unit 24 includes a plurality of decode units 70A–70F, an ESP/EBP lookahead unit 72, a lookahead address/result calculation unit 74, a dispatch control unit 76, and an operand collapse unit 78. Decode units 70A–70F are coupled to receive instructions from alignment unit 22. Decode units 70A–70F are coupled to provide decoded instructions to FPU/multimedia unit 40, ESP/EBP lookahead unit 72, future file 26, and lookahead address/result calculation unit 74. ESP/EBP lookahead unit 72 is coupled to lookahead address/result calculation unit 74, as is future file 26. Lookahead address/result calculation unit 74 is further coupled load/store unit 36 and dispatch control unit 76. Dispatch unit 76 is further coupled to operand collapse unit 78, future file 26, load/store unit 36, and reorder buffer 28. Operand collapse unit 78 is coupled to instruction windows 30.

Each decode unit 70A–70F forms an issue position to which alignment unit 22 aligns an instruction. While not indicated specifically throughout FIG. 3 for simplicity the drawing, a particular instruction remains within its issue position as the instruction moves through lookahead/collapse unit 24 and is routed to one of instruction windows 30A–30B if not completed within lookahead/collapse unit 24.

Decode units 70A–70F route FPU/multimedia instructions to FPU/multimedia unit 40. However, if the FPU/multimedia instructions include memory operands, memory operations are also dispatched to load/store unit 36 in response to the instruction through lookahead address/result calculation unit 74. Additionally, if the address for the memory operations cannot be generated by lookahead address/result calculation unit 74, an address generation operation is dispatched to one of address generation units 34A–34D via instruction windows 30A–30B. Still further, entries within reorder buffer 28 are allocated to the FPU/multimedia instructions for maintenance of program order. Generally, entries within reorder buffer 28 are allocated from decode units 70A–70F for each instruction received therein.

Each of decode units 70A–70F may be further configured to determine: (i) whether or not the instruction uses the ESP or EBP registers as a source operand; and (ii) whether not the instruction modifies the ESP/EBP registers (i.e. has the ESP or EBP registers as a destination operand). Indications of these determinations are provided by decode units 70A–70F to ESP/EBP lookahead unit 72. ESP/EBP lookahead unit 72 generates lookahead information for each instruction which uses the ESP or EBP registers as a source operand. The lookahead information may include a constant to be added to the current lookahead value of the corresponding register and an indication of a dependency upon an instruction in a prior issue position. In one embodiment, ESP/EBP lookahead unit 72 is configured to provide lookahead information as long as the set of concurrently decoded instructions provided by decode units 70A–70F do not include more than: (i) two push operations (which decrement the ESP register by a constant value); (ii) two pop operations (which increment ESP register by a constant value); (iii) one move to ESP register; (iv) one arithmetic/logical instruction having the ESP as a destination; or (v) three instructions which update ESP. If one of these restrictions is exceeded, ESP/EBP lookahead unit 72 is configured to stall instructions beyond those which do not exceed restrictions until the succeeding clock cycle (a "split line" case). For those instructions preceded, in the same clock cycle but in earlier issue positions, by instructions which increment or decrement the ESP register, ESP/EBP lookahead unit 72 generates a constant indicating the combined total modification to the ESP register of the preceding instructions. For those instructions preceded by a move or arithmetic operation upon the ESP or EBP registers, ESP/EBP lookahead unit 72 generates a value identifying the issue position containing the move or arithmetic instruction.

The lookahead values may be used by lookahead address/result calculation unit 74 to generate either a lookahead address corresponding to the instruction within the issue position (thereby inhibiting an address generation operation which would otherwise be performed by one of address generation units 34A–34D) or a lookahead result corresponding to the instruction (thereby providing lookahead state to future file 26 earlier in the pipeline). Performance may be increased by removing address generation operations and/or providing lookahead state prior to functional units 32A–32D and address generation units 34A–34D. Many x86 code sequences include a large number of relatively simple operations such as moves of values from a source to destination without arithmetic/logical operation or simple arithmetic operations such as add/subtract by small constant or increment/decrement of a register operand. Accordingly, functional units 32A–32D may typically execute the more complex arithmetic/logical operations and branch instructions and address generation units 34A–34D may typically perform the more complex address generations. Instruction throughput may thereby be increased.

Decode units 70A–70F may be still further configured to identify immediate data fields from the instructions decoded therein. The immediate data is routed to lookahead address/result calculation unit 74 by decode units 70A–70F. Additionally, decode unit 70A–70F are configured to identify register operands used by the instructions and to route register operand requests to future file 26. Future file 26 returns corresponding speculative register values or result queue tags for each register operand. Decode units 70 further provide dependency checking between the line of instructions to ensure that an instruction which uses a result of an instruction within a different issue position receives a tag corresponding to that issue position.

Lookahead address/result calculation unit 74 receives the lookahead values from ESP/EBP lookahead units 72, the immediate data from decode units 70A–70F, and the speculative register values or result queue tags from future file 26. Lookahead address/result calculation unit 74 attempts to generate either a lookahead address corresponding to a memory operand of the instruction, or a lookahead result if the instruction does not include a memory operand. For example, simple move operations can be completed (with respect to functional units 32 and address generation units 34) if an address generation can be performed by lookahead address/result calculation unit 74. In one embodiment, lookahead address/result calculation unit 74 is configured to compute addresses, using displacement only, register plus displacement, ESP/EBP plus displacement, and scale-index-base addressing mode except for index or base registers being ESP/EBP. Load/store unit 36 performs the memory operation and returns the memory operation results via result buses 48. Even if no address is generated for a memory operation by lookahead address/result calculation unit 74, lookahead address/result calculation unit 74 indicates the memory operation and corresponding result queue tag to load/store unit 36 to allocate storage within load/store unit 36 for the memory operation.

Simple arithmetic operations which increment or decrement a source operand, add/subtract a small immediate value to a source operand, or add/subtract two register source operands may also be completed via lookahead address/result calculation unit 74 if the source operands are available from future file 26 (i.e. a speculative register value is received instead of a result queue tag). Instructions completed by lookahead address/result calculation units 74 are indicated as completed and are allocated entries in reorder buffer 28 but are not dispatched to instruction windows 30. Lookahead address/result calculation unit 74 may comprise, for example, an adder for each issue position along with corresponding control logic for selecting among the lookahead values, immediate data, and speculative register values. It is noted that simple arithmetic operations may still be forwarded to instruction windows 30 for generation of condition flags, according to the present embodiment. However, generating the functional result in lookahead address/result calculation unit 74 provides the lookahead state early, allowing subsequent address generations/instructions to be performed early as well.

Lookahead address/result calculation unit 74 may be configured to keep separate lookahead copies of the ESP/EBP registers in addition to the future file copies. However, if updates to the ESP/EBP are detected which cannot be calculated by lookahead address/result calculation unit 74, subsequent instructions may be stalled until a new lookahead copy of the ESP/EBP can be provided from future file 26 (after execution of the instruction which updates ESP/EBP in the undeterminable manner).

Dispatch control unit 76 determines whether or not a group of instructions are dispatched to provide pipeline flow control. Dispatch control unit 76 receives instruction counts from instruction windows 30 and load/store counts from load/store unit 36 and, assuming the maximum possible number of instructions are in flight in pipeline stages between dispatch control units 76 and instruction windows 30 and load/store unit 36, determines whether or not space will be available for storing the instructions to be dispatched within instruction windows 30 and/or load/store unit 36 when the instructions arrive therein. If dispatch control unit 76 determines that insufficient space will be available in load/store unit 36 and either instruction window 30, dispatch is stalled until the instruction counts received by dispatch control unit 76 decrease to a sufficiently low value.

Upon releasing instructions for dispatch through dispatch control unit 76, future file 26 and reorder buffer 28 are updated with speculatively generated lookahead results. In one embodiment, the number of non-ESP/EBP updates supported may be limited to, for example, two in order to limit the number of ports on future file 26. Furthermore, operand collapse unit 78 collapses speculatively generated lookahead results into subsequent, concurrently decoded instructions which depend upon those results as indicated by the previously determined intraline dependencies. In this manner, the dependent instructions receive the speculatively generated lookahead results since these results will not subsequently be forwarded from functional units 32A–32D. Those instructions not completed by lookahead address/result calculation unit 74 are then transmitted to one of instruction windows 30A–30B based upon the issue position to which those instructions were aligned by alignment unit 22.

It is noted that certain embodiments of processor 10 may employ a microcode unit (not shown) for executing complex instructions by dispatching a plurality of simpler instructions referred to as a microcode routine. Decode units 70A–70F may be configured to detect which instructions are microcode instructions and to route the microcode instructions to the microcode unit. For example, the absence of a directly decoded instruction output from a decode unit 70 which received a valid instruction may be an indication to the microcode unit to begin execution for the corresponding valid instruction. It is further noted that various storage devices are shown in FIGS. 2 and 3 (e.g. devices 79A, 79B, and similar devices in FIG. 2 and devices 79C, 79D and similar devices in FIG. 3). The storage devices represent latches, registers, flip-flops and the like which may be used to separate pipeline stages. However, the particular pipeline stages shown in FIGS. 2 and 3 are but one embodiment of suitable pipeline stages for one embodiment of processor 10. Other pipeline stages may be employed in other embodiments.

It is noted that, while the x86 instruction set and architecture has been used as an example above and may be used as an example below, any instruction set and architecture may be used. Additionally, displacements may be any desirable size (in addition to the 8 bit and 32 bit sizes used as examples herein). Furthermore, while cache line fetching may be described herein, it is noted that cache lines may be sectors, and sectors may be fetched, if desirable based upon cache line size and the number of bytes desired to be fetched.

Figure 4:
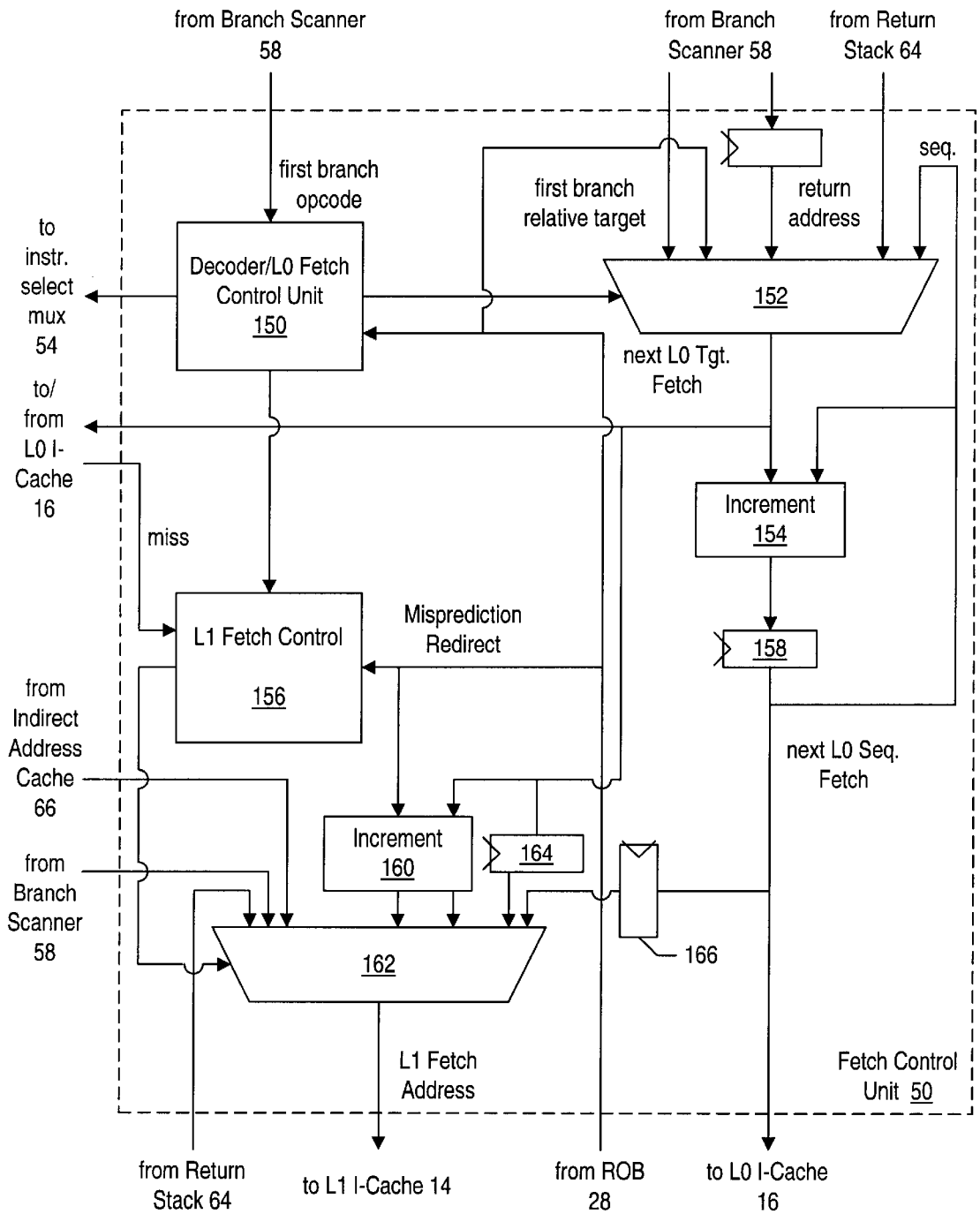
FIG. 4 is a block diagram of one embodiment of a fetch control unit shown in FIG. 2.

Turning next to FIG. 4, a block diagram of one embodiment of fetch control unit 50 is shown. Other embodiments are possible contemplated. As shown in FIG. 4, fetch control unit 50 includes a decoder/L0 fetch control unit 150, an L0 fetch address mux 152, an incrementor 154, an L1 fetch control unit 156, an incrementor 160, and an L1 fetch address mux 162. Decoder/L0 fetch control unit 150 is coupled to receive the first branch opcode corresponding to the first branch instruction within the run from branch scanner 58 and to reorder buffer 28 to receive a misprediction redirection indication. Additionally, decoder/L0 fetch control unit 150 is coupled to L0 fetch address mux 152, L1 fetch control unit 156, and instruction select mux 54. L0 fetch address mux 152 is coupled to receive the first target address (assuming a small displacement) corresponding to the first branch instruction within the run as selected by branch scanner 58. The second target address corresponding to the second branch instruction address is also provided to L0 fetch address mux 152 with a one clock cycle delay (again, assuming a small displacement). Additionally, L0 fetch address mux 152 is configured to receive the return address provided by return stack 64 (i.e. the address at the top of return stack 64), the corrected fetch address provided by reorder buffer 28 upon misprediction redirection, and the sequential address to the address fetched in the previous clock cycle (generated by incrementor 154). L0 fetch address mux 152 is coupled to provide the target fetch address to L0 I-cache 16 and to incrementor 160. Incrementor 160 is also coupled to receive the corrected fetch address from reorder buffer 28 upon detection of a misprediction redirection. L1 fetch control unit 156 is further coupled to L0 I-cache 16 to receive a miss indication, to reorder buffer 28 to receive an indication of a misprediction, and to decoder/L0 fetch control unit 150 to receive an indication of decoding a branch instruction using an indirect address or 32 bit displacement, or a return instruction. L1 fetch address mux 162 is coupled to indirect address cache 66 to receive a predicted indirect target address, to branch scanner 58 to receive 32-bit target addresses corresponding to relative branch instructions, to incrementor 160 to received the next sequential address to the corrected fetch address and to the predicted branch fetch address for L0 I-cache 16, to return stack 64 to receive the return address which is second to the top of return stack 64, to fetch address mux 152 to receive the target fetch address, to register 158 to receive the sequential fetch address, and to L1 I-cache 14 to provide an L1 fetch address. Fetch control unit 50 provides a sequential fetch address to L0 I-cache 16 via a register 158.

Decoder/L0 fetch control unit 150 is configured to decode the opcode corresponding to the first identified branch instruction from branch scanner 58 in order to select the target fetch address for L0 I-cache 16. In order to provide the target fetch address as rapidly as possible, decoder/L0 fetch control unit 150 decodes only a portion of the opcode byte received from branch scanner 58 according to one particular embodiment of decoder/L0 fetch control unit 150. More particularly, for the x86 instruction set, decoder/L0 fetch control unit 150 may decode the four most significant bits of the opcode byte identified by the set start and control transfer bits to select one of the first target address from branch scanner 58, the return address from return stack 64, and the sequential address.

Because the branch prediction corresponding to the first branch instruction within the run is not available until late in the clock cycle in which the fetch address is selected, in this particular embodiment, decoder/L0 fetch control unit 150 does not attempt to select the second branch target address as the target fetch address. If the first branch instruction is predicted not taken, via branch history table 60, the second target address corresponding to the second identified branch instruction (if any) may be fetched in a subsequent clock cycle if the second branch instruction is predicted taken by branch history table 60. Also, if the first branch is predicted taken but the first target address is within the same run as the first branch, the sequential address is selected. If the first branch does not branch past the second branch within the run, the second target address is selected during the subsequent clock cycle. Similarly, if the first branch instruction uses an indirect target address or 32-bit relative target address, L0 fetch address mux 152 may select an address and the fetched instructions may be discarded in favor of instructions at the actual branch target. In these cases, the fetch address selected by decoder/L0 fetch control unit 150 is a don't care, and the actual fetch address is provided to L1 I-cache 14 by L1 fetch control unit 156. Decoder/L0 fetch control unit 150 signals L1 fetch control unit 156 upon detecting a 32-bit relative target address, a branch instruction using an indirect address, and a return instruction.

L1 fetch control unit 156 generates an L1 fetch address for L1 I-cache 14 by controlling L1 fetch address mux 162. The cache line corresponding to the L1 fetch address is conveyed to L0 I-cache 16 for storage, and may be selected for dispatch if the address is a fetch address (as described above). L1 fetch control unit 156 selects the L1 fetch address from one of several sources. If a branch misprediction is signaled by reorder buffer 28, the sequential address to the corrected fetch address (received from incrementor 160) is selected since the other address sources are based upon instructions within the mispredicted path. If no branch misprediction is signalled and an L0 fetch address miss is detected, L1 fetch control unit 156 selects the L0 fetch address miss for fetching (via register 164 or register 166, depending upon which address misses). It is noted that either the sequential fetch address or the target fetch address (or both) may miss L0 I-cache 16. Each miss is indicated via miss signals from L0 I-cache 16. If the target fetch address is a miss, the target address may be selected for fetching from L1 I-cache 14 (received by L1 fetch address mux 162 via register 164). If the target address is a hit and the sequential fetch address is a miss, the sequential fetch address may be selected for fetching from L1 I-cache 16. Alternative strategies for selecting which miss address to fetch may be employed as well. If no miss is detected, L1 fetch control unit 156 selects either the indirect address provided by indirect address cache 66 or a 32-bit branch target address from branch scanner 58 responsive to signals from decoder/L0 fetch control unit 150 indicating a decode of such instructions. If L1 fetch control unit 156 receives a signal from decoder/L0 fetch control unit 150 indicating that a return instruction has been detected, L1 fetch control unit 156 selects the return address which is next to the top of return stack 64 (i.e. the return address which will be the top of return stack 64 upon deletion of the return address being fetched from L0 I-cache 16). If no signals are received from decoder/L0 fetch control unit 150, L1 fetch control unit 156 prefetches the cache line sequential to the target address selected by fetch address mux 152 (as received from incrementor 160).

Indirect addresses and 32-bit target addresses are not fetched from L0 I-cache 16 in the present embodiment because these types of target addresses are typically selected by a programmer when the target instruction sequence is not spatially located within memory near the branch instruction. Because L0 I-cache 16 stores a small number of cache lines most recently accessed in response to the code sequence being executed, it may be statistically less likely that the target instruction sequence is stored in the L0 I-cache 16. Accordingly, these fetch addresses are conveyed directly to L1 I-cache 14 for fetching. A fetch address may be conveyed to L0 I-cache 16, but the instructions are discarded. By fetching from L1 I-cache 14 without first checking L0 I-cache 16 for a hit, a clock cycle of latency may be saved.

It is noted that, in cases in which a fetch address is not selected for L1 I-cache 14, a prefetch address is selected in response to the selected fetch address for L0 I-cache 16. For example, if a return address is selected for fetching from L0 I-cache 16, then the return address which is next to the top of return stack 64 is selected for prefetching from L1 I-cache 14. If a misprediction redirection is selected, the next sequential fetch address to the corrected fetch address is selected. If a branch target address is selected, the next sequential address to the branch target address is selected. Finally, if a sequential address is selected, the next incremental address to that sequential address is selected. It is further noted that, while cache lines and runs are discussed as being fetched in various portions of the present disclosure, generally, each cache line includes instruction bytes which form one or more instructions. Hence, each fetch may be viewed as fetching a cache line, a cache line of instruction bytes, a run of instructions, or instructions. Other embodiments may fetch and prefetch instructions in units other than cache lines or runs, as desired. A sequential address to a particular address may be the address of instructions subsequent to the unit of fetch including the particular address.

Incrementor 154 is configured to increment the fetch address corresponding to the run selected for dispatch based on the branch prediction information received from branch history table 60. Decoder/L0 fetch control unit 150 includes logic for selecting the run, via instruction select multiplexor 54, based on L0 I-cache hit information as well as the branch prediction information. This logic also causes incrementor 154 to increment the fetch address corresponding to the selected run (either the sequential fetch address provided from register 158 or the target fetch address provided from L0 fetch address mux 152). Accordingly, the sequential fetch address for the subsequent clock cycle is generated and stored in register 158. Incrementor 160 increments both the corrected fetch address and the target fetch address. It is noted that incrementors 154 and 160 increment to the next run boundary (i.e. so that a fetch address of the next run is generated).

It is noted that, while a particular set of sources for L0 I-cache fetch addresses, L1 I-cache fetch addresses, and L1 I-cache prefetch addresses are described above, other sets of address sources are contemplated. The set of address sources described above may be added to, deleted from, or both to form other contemplated sets of sources. Furthermore, other contemplated embodiments may generate only one fetch address per clock cycle for L0 I-cache (instead of a target fetch address and a sequential fetch address as described above). Still other contemplated embodiments may generate other fetch addresses for L0 I-cache 16 as well.

In one particular embodiment of decoder/L0 fetch control unit 150 employed within one embodiment of processor 10 employing the x86 instruction set, opcodes having the four most significant bits equal to (in hexadecimal) 7, E, or 0 result in the first target address being selected by L0 fetch address mux 152. Opcodes having the four most significant bits equal to C result in the return address from return stack 64 being selected, and opcodes having the four most significant bits equal to F cause the sequential address to be selected.

In the x86 instruction set, branch instruction opcodes having the four most significant bits equal to 7 are conditional jump instructions having eight bit relative displacements. Accordingly, an opcode corresponding to a set start bit and set control transfer bit which has the four most significant bits equal to 7 correctly selects the target address provided by branch scanner 58. Branch instruction opcodes having the four most significant bits equal to E may be conditional jump instructions with eight bit relative displacements, or call or unconditional jump instructions having either eight bit relative displacements or 32 bit relative displacements. For these cases, decoder/L0 fetch control unit 150 selects the first target address provided by branch scanner 58 and, if further decode indicates that a 32-bit displacement field is included in the branch instruction, the instructions fetched in response to the selection are discarded and the correct fetch address is fetch from L1 I-cache 14 via L1 fetch control unit 156 selecting, via L1 fetch address mux 162, the 32-bit fetch address from branch scanner 58. Finally, branch instruction opcodes having the four most significant bits equal to 0 specify 32-bit relative displacements. Since decoder/L0 fetch control unit 150 cannot select the 32 bit target address for fetching from L0 I-cache 16 in the present embodiment, decoder/L0 fetch control unit 150 selects the first target address provided from branch scanner 58 and signals L1 fetch control unit. 156 to select the 32-bit branch target address from branch scanner 58 for fetching from L1 I-cache 14.

Branch instruction opcodes having the four most significant bits equal to C are return instructions, and hence the return address provided by return address stack 64 provides the predicted fetch address. On the other hand, branch instruction opcodes having the four most significant bits equal to F are call or unconditional jump instructions which use indirect target address generation. The indirect address is not provided to L0 fetch address mux 152, and hence a default selection of the sequential address is performed. The instructions fetched in response to the sequential address are discarded and instructions fetched from L1 I-cache 14 are provided during a subsequent clock cycle.

It is noted that, although the above description describes an embodiment of decoder/L0 fetch control unit 150 which partially decodes an opcode to select a target, other embodiments may employ full decodes or other partial decodes, as desired.

Figure 5:
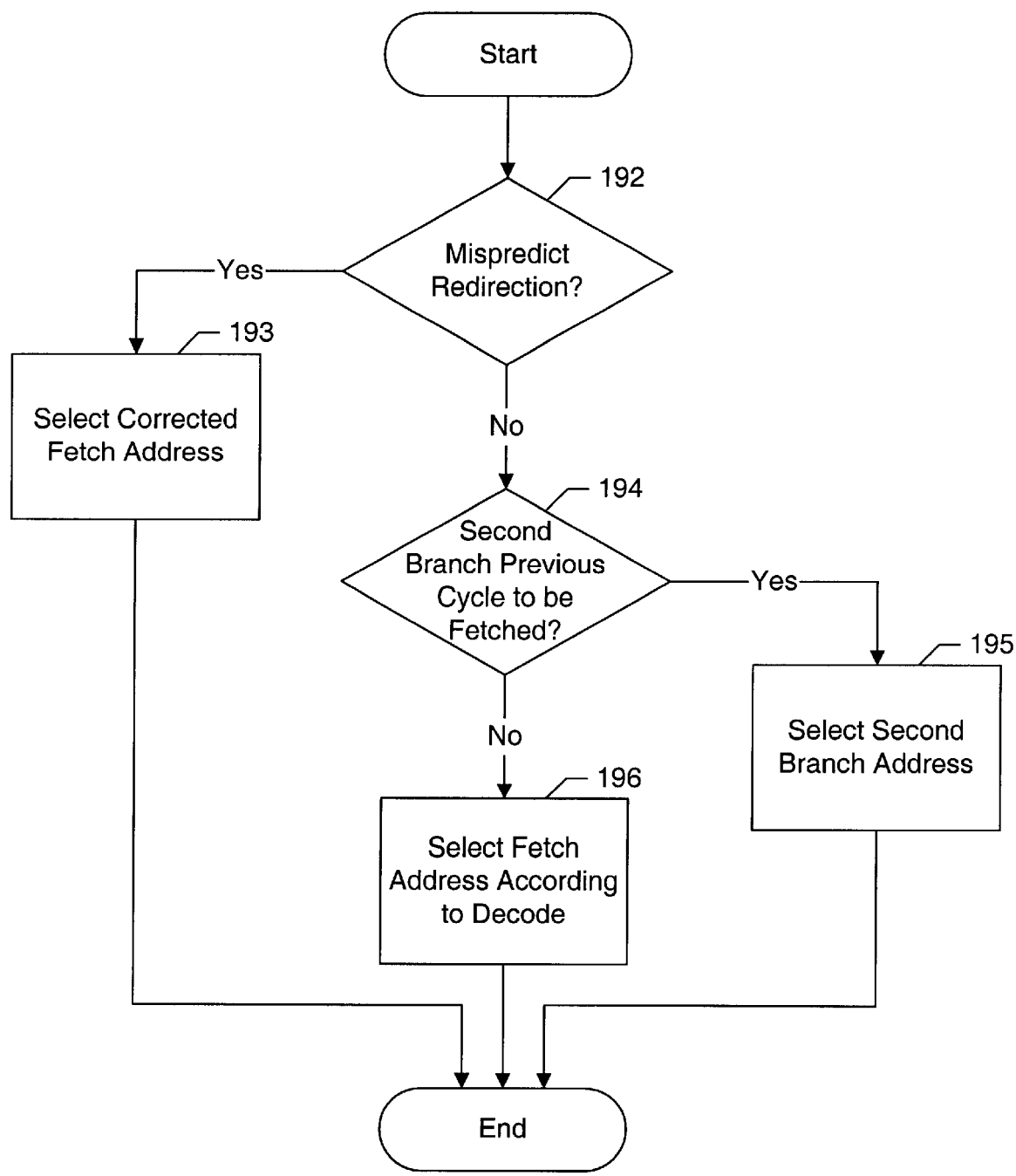
FIG. 5 is a flowchart illustrating selection of a fetch address for an L0 cache shown in FIG. 1 according to one embodiment of the fetch control unit shown in FIGS. 2 and 4.

Turning next to FIG. 5, a flowchart is shown illustrating operation of one embodiment of decoder/L0 fetch control unit 150. Other embodiments are possible and contemplated. While shown as a serial series of steps in FIG. 5 for ease of understanding, it is understood that the steps illustrated may be performed in any suitable order, and may be performed in parallel by combinatorial logic employed within decoder/L0 fetch control unit 150.

Decoder/L0 fetch control unit 150 determines if a branch misprediction is being signalled by reorder buffer 28 (decision block 192). If a misprediction is signalled, the corrected fetch address received from reorder buffer 28 is selected (step 193). On the other hand, if a misprediction is not signalled, decoder/L0 fetch control unit 150 determines if the second target address corresponding to the second branch instruction identified during the previous clock cycle by branch scanner 58 is to be fetched (decision block 194). The second target address may be fetched if the first branch instruction was predicted not-taken and the second branch instruction was predicted taken. Additionally, the second target address may be fetched if the first branch instruction was predicted taken, but was a small forward displacement which does not cancel the second branch instruction, and the second branch instruction was predicted taken. If the second target address is to be fetched, decoder/L0 fetch control unit 150 selects the second target address (which was received in the previous clock cycle and is one clock cycle delayed in reaching L0 fetch address mux 152—step 195). Finally, if the second target address is not to be fetched, decoder/L0 fetch control unit 150 selects one of the first target address, the return stack address, or the sequential address as described above (step 196).

Figure 6:
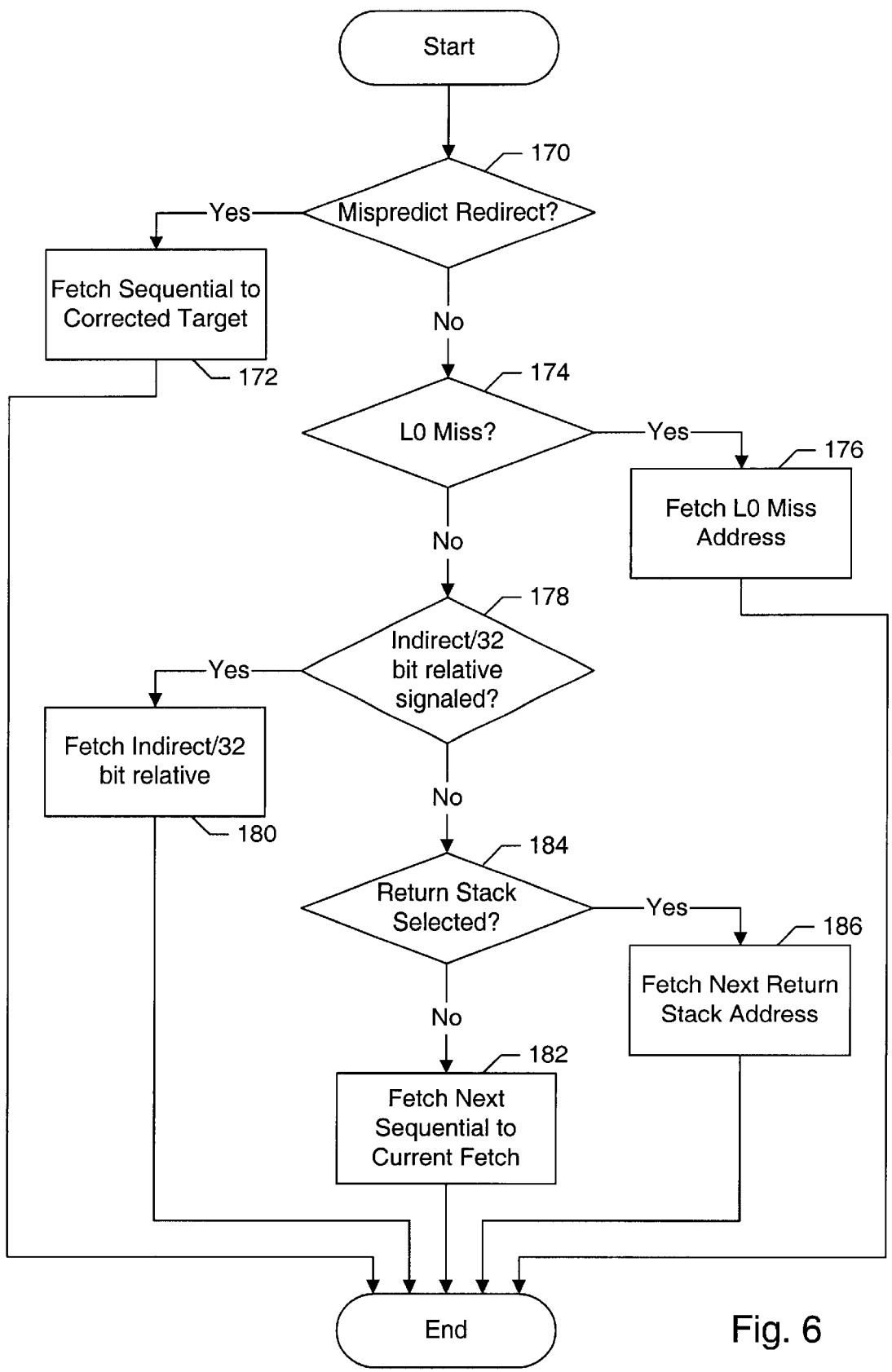
FIG. 6 is a flowchart illustrating selection of a fetch address for an L1 cache shown in FIG. 1 according to one embodiment of the fetch control unit shown in FIGS. 2 and 4.

Turning now to FIG. 6, a flowchart is shown illustrating operation of one embodiment of L1 fetch control unit 156. Other embodiments are possible and contemplated. While shown as a serial series of steps in FIG. 6 for ease of understanding, it is understood that the steps illustrated may be performed in any suitable order, and may be performed in parallel by combinatorial logic employed within L1 fetch control unit 156.

If a branch misprediction redirection is received by L1 fetch control unit 156 (decision block 170), the sequential cache line to the cache line corresponding to the corrected fetch address is prefetched from L1 I-cache 14 (step 172). On the other hand, if a branch misprediction redirection is not received, L1 fetch control unit 156 determines if an L0 I-cache miss has occurred (decision block 174). If an L0 I-cache miss is detected, the address missing L0 I-cache 16 is fetched from L1 I-cache 14 (step 176). In the absence of an L0 I-cache miss, L1 fetch control unit 156 determines if either an indirect target address or a 32-bit relative target address has been detected by decoder/L0 fetch control unit 150 (decision block 178). If such a signal is received, the indirect address received from indirect address cache 66 or the 32-bit relative target address received from branch scanner 58 is fetched from L1 I-cache 14 depending upon which signal is received (step 180). If the return stack address is selected for fetching from L0 I-cache 16 (decision block 184), the next return stack address is prefetched from L1 I-cache 14 (step 186). Finally, if the return stack is not signalled, L1 fetch control unit 156 prefetches the next sequential cache line to the current target fetch address (step 182).

Figure 7:
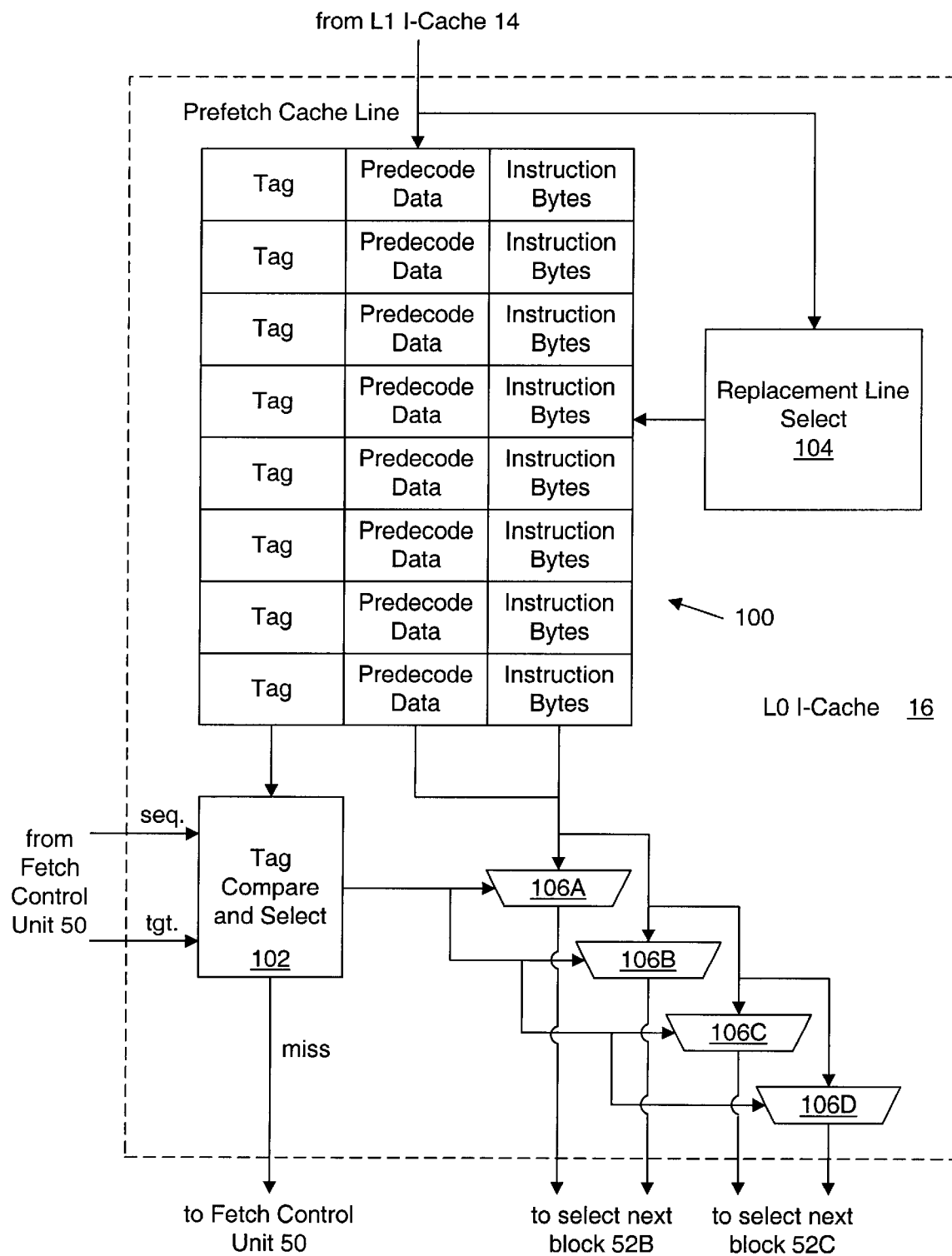
FIG. 7 is a block diagram of one embodiment of an L0 I-cache shown in FIG. 1.

Turning now to FIG. 7, a block diagram of one embodiment of L0 I-cache 16 is shown. Other embodiments are possible and contemplated. In the embodiment shown, L0 I-cache 16 includes a cache storage 100, a tag compare and select unit 102, a replacement line select unit 104, and a set of line select muxes 106A–106D. Cache storage 100 is coupled to receive a prefetched cache line from L1 I-cache 14, and is further coupled to tag compare and select unit 102, replacement line select unit 104, and line select muxes 106. Replacement line select unit 104 is firer coupled to receive an indication that a prefetched cache line is being provided by L1 I-cache 14. Tag compare and select unit 102 is coupled to receive the target fetch address and sequential fetch address provided by fetch control unit 50, and to provide a miss indication to fetch control unit 50 corresponding to each of the target fetch address and the sequential fetch address. Furthermore, tag compare and select unit 102 provides selection controls to line select muxes 106. Muxes 106 are coupled to select next blocks 52B and 52C. More particularly, line select mux 106A provides the sequential cache line (corresponding to the sequential address provided by fetch control unit 50) to select next block 52B. Line select mux 106B provides the next incremental cache line to the sequential cache line. Line select mux 106C provides the target cache line, and line select mux 106D provides the sequential line to the target cache line, to select next block 52C.

Cache storage 100 comprises a set of cache line storage locations. Each cache line storage location is configured to store an address tag identifying the cache line, the instruction bytes within the cache line, and the corresponding predecode data. Each of the cache lines is read each clock cycle and provided to each of line select muxes 106. In this manner, any cache line stored in cache storage 100 may be selected to be provided to select next blocks 52B–52C. Accordingly, if both the addressed cache line (sequential or branch target) and the cache line sequential to the addressed cache line are hits in L0 I-cache 16, a full run of instructions is selectable for dispatch even if the cache line offset portion of the address is near the end of the cache line. In other words, reading each stored cache line and selecting therefrom may be advantageous to providing high fetch bandwidth.

The instruction bytes and predecode data corresponding to each cache line are provided to line select muxes 106, and the tags for each cache line are provided to tag compare and select unit 102. Tag compare and select unit 102 compares the tags to the sequential and branch target addresses provided by fetch control unit 50 in order to generate selection controls for line select muxes 106. More particularly, tag compare and elect unit 102 compares the sequential address to each address tag. A match between one of the tags and the sequential address causes tag compare and select unit 102 to select the corresponding instruction bytes and predecode data via line select mux 106A. If no match is detected, tag compare and select unit 102 activates a corresponding miss signal to fetch control unit 50. Furthermore, the output of line select mux 106A indicates invalid in the case of a miss, and the bytes are ignored by branch scanner 58 and instruction scanner 56.

Additionally, tag compare and select unit 102 compares the tags to the next incremental cache line address from the sequential address. The next incremental cache line address may be provided by fetch control unit 50, or may be calculated by tag compare and select unit 102. Alternatively, replacement line select unit 104 may manage the cache lines stored in cache storage 100 such that the next incremental cache line is stored contiguous to the sequential cache line and may include an indication that the cache line is the next incremental cache line. A match between one of the tags and the next incremental address is used to select the corresponding instruction bytes and predecode data via line select mux 106B. If no match is detected, the output of line select mux 106B indicates invalid and the bytes are ignored by branch scanner 58 and instruction scanner 56.

Tag compare and select unit 102 further compares the branch target address to each address tag. A match between one of the tags and the branch target address causes tag compare and select unit 102 to select the corresponding instruction bytes and predecode data via line select mux 106C. If no match is detected, tag compare and select unit 102 activates a corresponding miss signal to fetch control unit 50. Furthermore, the output of line select mux 106C indicates invalid in the case of a miss, and the bytes are ignored by branch scanner 58 and instruction scanner 56.

Additionally, tag compare and select unit 102 compares the tags to the sequential cache line address to the branch target address. The sequential cache line address to the branch target address may be provided by fetch control unit 50, or may be calculated by tag compare and select unit 102. Alternatively, replacement line select unit 104 may manage the cache lines stored in cache storage 100 such that the sequential cache line is stored contiguous to the branch target cache line and may include an indication that the cache line is the sequential cache line. A match between one of the tags and the sequential address to the branch target address is used to select the corresponding instruction bytes and predecode data via line select mux 106D. If no match is detected, the output of line select mux 106D indicates invalid and the bytes are ignored by branch scanner 58 and instruction scanner 56.

Replacement line select unit 104 selects which of the cache lines within cache line storage 100 is to be replaced with a prefetched cache line received from L1 I-cache 14. A variety of replacement strategies may be used. For example, replacement line select unit 104 may monitor which cache lines are fetched from L0 I-cache 16 and employ a least recently used (LRU)-like replacement algorithm (e.g. true LRU, modified LRU, etc.). Alternatively, replacement line select unit 104 may operate L0 I-cache 104 as a first-in, first-out FIFO storage for replacement purposes. In such an embodiment, replacement line select unit 104 may include a pointer indicating a particular cache line storage location. Upon selecting that cache line storage location for replacement, the pointer may be incremented to the next storage location. In yet another alternative, random replacement may be used. Any suitable replacement algorithm may be employed, as desired.

Prior to selecting a cache line for replacement, replacement line select unit 104 may compare the prefetch address provided by L1 I-cache 14 to the tags stored in L0 I-cache 16. If the prefetched cache line is already stored in L0 I-cache 16, then the prefetched cache line may be discarded instead of replacing a different cache line.

Figure 8:
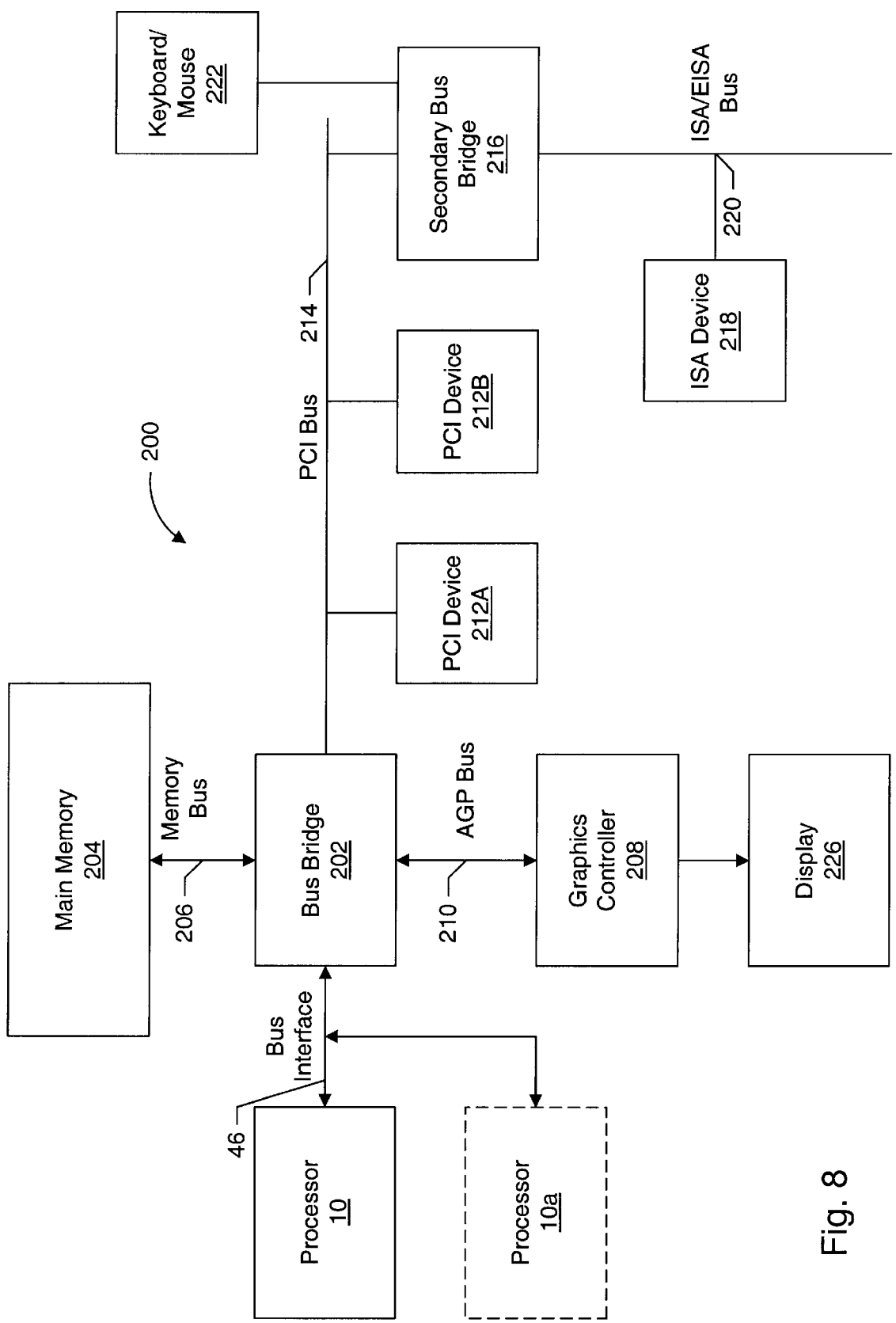
FIG. 8 is a block diagram of one embodiment of a computer system including the processor shown in FIG. 1.

Turning now to FIG. 8, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through bus interface 46.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. For example, in one embodiment, secondary bus bridge 216 includes a master PCI arbiter (not shown) for arbitrating ownership of PCI bus 214. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to bus interface 46 between processor 10 and bus bridge 202 in other embodiments. Alternatively, the external cache may be coupled to bus bridge 202 and cache control logic for the external cache may be integrated into bus bridge 202.

Main memory 204 is a memory in which application programs are stored and from which processor 10 primarily executes. A suitable main memory 204 comprises DRAM (Dynamic Random Access Memory), and preferably a plurality of banks of SDRAM (Synchronous DRAM).

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may share bus interface 46 with processor 10 (as shown in FIG. 8) or may be connected to bus bridge 202 via an independent bus.

In accordance with the above disclosure, a processor has been shown which employs a pair of instruction caches and a fetch algorithm which attempts to maximize the fetch bandwidth achievable from the caches. Higher fetch bandwidth than that achievable in single cache configurations may be achieved using the combination. Accordingly, a wide issue superscalar processor may more frequently receive sufficient instructions to maximize the average number of instructions dispatched/executed per clock cycle.

Numerous variations and modifications will become apparent to those skilled in the art once the above disclosure is fully appreciated. It is intended that the following claims be interpreted to embrace all such variations and modifications.

What is claimed is:

1. A processor comprising:
   a first instruction cache configured to store instructions;
   a second instruction cache configured to store instructions; and
   a fetch unit coupled to the first instruction cache and the second instruction cache,
      wherein the fetch unit is configured to generate a branch target address responsive to a branch instruction which includes a displacement, and wherein the fetch unit is configured to select one of the first instruction cache and the second instruction cache from which to fetch instructions stored at the branch target address responsive to a size of the displacement.

2. The processor as recited in claim 1 wherein the fetch unit is configured to select the first instruction cache responsive to a first size of the displacement, and wherein the fetch unit is configured to select the second instruction cache responsive to a second size of the displacement, and wherein the first size is smaller than the second size.

3. The processor as recited in claim 2 wherein the first size is 8 bits and the second size is 32 bits.

4. The processor as recited in claim 2 wherein the first instruction cache has a first latency which is less than a second latency of the second instruction cache.

5. The processor as recited in claim 2 wherein the first instruction cache has a first storage capacity which is less than a second storage capacity of the second instruction cache.

6. The processor as recited in claim 2 wherein the fetch unit is further configured to generate a prefetch address for the second instruction cache if the first instruction cache is selected to receive the fetch address, and wherein the prefetch address is a sequential address to the branch target address.

7. A method comprising:
   generating a branch target address responsive to a branch instruction having a displacement;
   selecting one of a first instruction cache and a second instruction cache as a selected instruction cache from which to fetch instructions corresponding to the branch target address responsive to a size of the displacement; and fetching the instructions from the selected instruction cache.

8. The method as recited in claim 7 wherein the selecting comprises:

selecting the first instruction cache as the selected instruction cache responsive to a first size of the displacement; and selecting the second instruction cache as the selected instruction cache responsive to a second size of the displacement, wherein the first size is smaller than the second size.

9. The method as recited in claim 8 wherein the first size is 8 bits and the second size is 32 bits.

10. The method as recited in claim 8 wherein the first instruction cache has a first latency which is less than a second latency of the second instruction cache.

11. The method as recited in claim 8 wherein the first instruction cache has a first storage capacity which is less than a second storage capacity of the second instruction cache.

12. The method as recited in claim 8 further comprising generating a prefetch address for the second instruction cache if the first instruction cache is selected in the selecting, and wherein the prefetch address is a sequential address to the branch target address.

13. A computer system comprising:

a processor including:
  a first instruction cache configured to store instructions;
  a second instruction cache configured to store instructions; and
  a fetch unit coupled to the first instruction cache and the second instruction cache, wherein the fetch unit is configured to generate a branch target address responsive to a branch instruction which includes a displacement, and wherein the fetch unit is configured to select one of the first instruction cache and the second instruction cache from which to fetch instructions stored at the branch target address responsive to a size of the displacement; and a peripheral device for communicating between the computer system and another computer system.

14. The computer system as recited in claim 13 wherein the peripheral device is a modem.

15. The computer system as recited in claim 13 further comprising an audio peripheral device.

16. The computer system as recited in claim 15 wherein the audio peripheral device includes a sound card.

17. The computer system as recited in claim 13 further comprising a second processor including:

a third instruction cache configured to store instructions;
a fourth instruction cache configured to store instructions; and
a second fetch unit coupled to the third instruction cache and the fourth instruction cache, wherein the second fetch unit is configured to generate a second branch target address responsive to a second branch instruction which includes a second displacement, and wherein the second fetch unit is configured to select one of the third instruction cache and the fourth instruction cache from which to fetch instructions stored at the second branch target address responsive to a size of the second displacement.

18. A processor comprising:

a first instruction cache configured to store instructions;
a second instruction cache configured to store instructions; and
a fetch unit coupled to the first instruction cache and the second instruction cache, wherein the fetch until is configured to select one of the first instruction cache and the second instruction cache from which to fetch instructions stored at a branch target address corresponding to a branch instruction including a displacement, wherein the fetch unit is configured to select one of the first instruction cache and the second instruction cache responsive to a size of the displacement.

19. The processor as recited in claim 18 wherein the fetch unit is configured to select the first instruction cache responsive to a first size of the displacement, and wherein the fetch unit is configured to select the second instruction cache responsive to a second size of the displacement, and wherein the first size is smaller than the second size.

20. The processor as recited in claim 19 wherein the first size is 8 bits and the second size is 32 bits.

21. The processor as recited in claim 19 wherein the first instruction cache has a first latency which is less than a second latency of the second instruction cache.

22. The processor as recited in claim 19 wherein the first instruction cache has a first storage capacity which is less than a second storage capacity of the second instruction cache.

23. The processor as recited in claim 18 wherein the fetch unit is further configured to select a sequential address to the branch target address for fetching from the second instruction cache if the first instruction cache is selected to receive the branch target address.

24. The processor as recited in claim 18 wherein the fetch unit comprises a branch scanner configured to generate the branch target address.

25. The processor as recited in claim 24 further comprising a predecode unit configured to predecode the branch instruction prior to storage in one of the first instruction cache or the second instruction cache, and wherein the predecode unit is configured to replace the displacement field within the branch instruction with an encoding of the branch target address prior to storing the branch instruction in the one of the first instruction cache or the second instruction cache.

26. The processor as recited in claim 25 wherein the branch scanner is configured to generate the branch target address by selecting the branch target address from the branch instruction.

* * * * *

UNITED STATES PATENT AND TRADEMARK OFFICE
CERTIFICATE OF CORRECTION

PATENT NO.    : 6,367,001 B1
DATED         : April 2, 2002
INVENTOR(S)   : David B. Witt It is certified that error appears in the above-identified patent and that said Letters Patent is hereby corrected as shown below:

<u>Title page,</u>
Item [22], please delete "Dec. 8, 2000" as the date filed, and insert -- Dec. 6, 2000 -- in place thereof.

Signed and Sealed this

Tenth Day of September, 2002

Attest:

Attesting Officer

JAMES E. ROGAN
*Director of the United States Patent and Trademark Office*